United States Patent [19]

Groen et al.

[11] Patent Number: 5,301,900
[45] Date of Patent: Apr. 12, 1994

[54] AUTOGYRO AIRCRAFT

[76] Inventors: Henry J. Groen, 1813 Downing Ave., Salt Lake City, Utah 84108; David L. Groen, Twenty Benchmark, Tooele, Utah 84074

[21] Appl. No.: 931,018

[22] Filed: Aug. 17, 1992

Related U.S. Application Data

[63] Continuation-in-part of Ser. No. 857,317, Mar. 25, 1992, abandoned, which is a continuation-in-part of Ser. No. 626,972, Dec. 12, 1990.

[51] Int. Cl.$^5$ .................... B64C 27/52; B64C 13/04
[52] U.S. Cl. .................... 244/17.25; 244/17.11; 244/225
[58] Field of Search .................... 244/8, 17.11, 17.19, 244/17.21, 17.25, 17.27, 87, 225; 416/102

[56] References Cited

U.S. PATENT DOCUMENTS

| | | | |
|---|---|---|---|
| 1,052,378 | 2/1913 | Porter | 244/17.25 |
| 1,590,497 | 6/1926 | de la Cierva . | |
| 1,838,327 | 12/1931 | Salisbury et al. . | |
| 1,884,847 | 10/1932 | Pitcairn . | |
| 1,947,901 | 2/1934 | de la Cierva . | |
| 1,977,834 | 10/1934 | Pitcairn . | |
| 2,037,745 | 4/1936 | Vaughn | 244/17.19 |
| 2,080,522 | 5/1937 | Wilford et al. . | |
| 2,154,601 | 4/1939 | Bennett . | |
| 2,454,981 | 11/1948 | Vint, Jr. | 244/87 |
| 2,534,353 | 12/1950 | Hiller et al. . | |
| 2,861,640 | 1/1958 | DuPont | 416/102 |
| 2,949,965 | 8/1960 | Detore et al. | 416/102 |
| 3,149,802 | 9/1964 | Wigal . | |
| 3,193,019 | 7/1965 | Drees et al. . | |
| 3,228,479 | 1/1966 | Nagler . | |
| 3,288,226 | 11/1966 | Lemont, Jr. et al. | 416/102 |
| 3,465,705 | 9/1969 | Bensen . | |
| 3,556,674 | 1/1971 | Foote . | |
| 4,071,206 | 1/1978 | Magill . | |
| 4,092,084 | 5/1978 | Barltrop . | |
| 4,195,800 | 4/1980 | Wallace . | |
| 4,730,795 | 3/1988 | David | 244/17.21 |
| 4,741,672 | 5/1988 | Brewer . | |

Primary Examiner—Michael S. Huppert
Assistant Examiner—Virna Lissi Ansley
Attorney, Agent, or Firm—Trask, Britt & Rossa

[57] ABSTRACT

An autogyro has a teetering semi-rigid rotary wing with rigid rotor blades. The angle of attack (blade pitch) of the rotor blades is fully adjustable in flight continuously over an operational range, and varies along the blade length. A prerotator rotates the rotor blades up to take-off speed at minimum drag, no lift and optimum engine efficiency. Engine power is disconnected from the rotor blades and their angle of attack is changed for optimum lift to facilitate smooth vertical takeoff. Rotor blade pitch is likewise adjusted during vertical landing. In flight, rotor blade angle of attack is varied to adjust autorotation, lift and drag at any flight airspeed. On the ground, the rotary wing is braked to prevent rotation.

The autogyro may roll, pitch, or yaw, with complete independence of blade pitch with respect to all other relative motions. The pedals have disproportionate forward and backward motions. The autogyro has retractable gear capable of fail-safe gear-up landing.

31 Claims, 32 Drawing Sheets

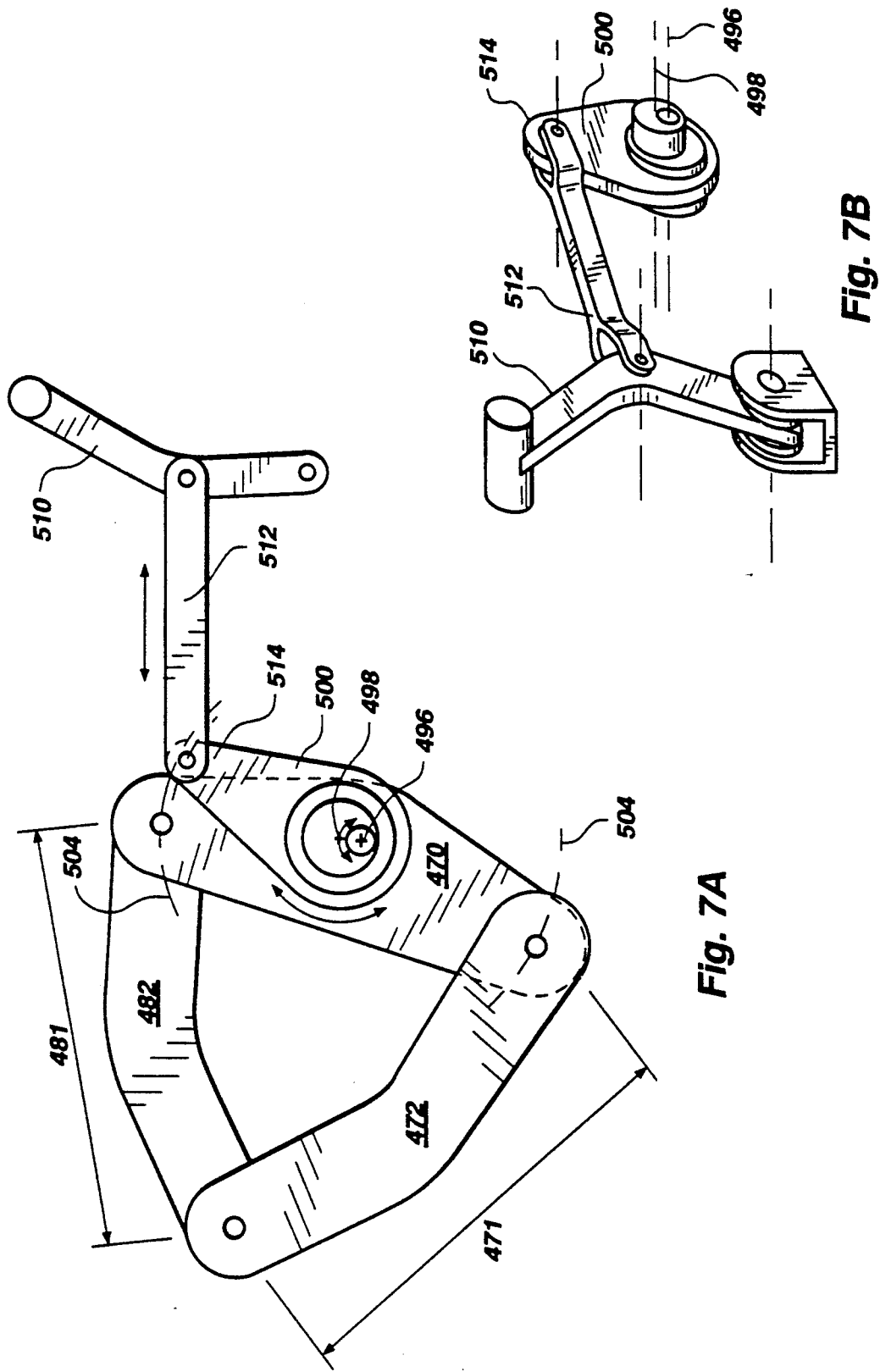

AUTOGYRO AIRCRAFT

RELATED APPLICATIONS

This application is a continuation-in-part of U.S. patent application Ser. No. 857,317 filed Mar. 25, 1992, now abandoned which is a continuation-in-part of U.S. patent application Ser. No. 626,972, filed Dec. 12, 1990.

BACKGROUND OF THE INVENTION

1. Field of the Invention

This invention relates to autogyro aircraft, components thereof and control systems therefor.

2. State of the Art

An autogyro aircraft derives lift from an unpowered, freely rotating rotary wing or plurality of rotary blades. The energy to rotate the rotary wing results from the forward movement of the aircraft in response to a thrusting engine such as a motor driven propeller.

During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upwardly toward the front of the autogyro, provides the driving force to rotate the wing. The Bernoulli effect of the airflow moving over the rotary wing surface creates lift.

Various autogyro devices in the past have provided some means to begin rotation of the rotary wing prior to takeoff, thus further minimizing the takeoff run down a runway.

U.S. Pat. No. 1,590,497 issued to Juan de la Cierva of Madrid, Spain, illustrated a very early embodiment of an autogyro Subsequently, de la Cierva obtained U.S. Pat. No. 1,947,901 which recognized the influence of the angle of attack of the blade of a rotary wing. The optimum angle of attack for the blades or rotary wing was described by Pitcairn in U.S. Pat. No. 1,977,834 at about the same time. In U.S. Pat. No. 2,352,342, Pitcairn disclosed an autogyro with blades which were fully hinged relative to the hub.

Even though the principal focus for low speed flight appears to have shifted to helicopters, there appears to have been some continuing interest in autogyro craft. However, development efforts appear to have largely been restricted to refinements of the early patented systems. For instance, Salisbury, et al., U.S. Pat. No. 1,838,327, showed a system to change the lift to drag response of a rotary wing but did not change the actual angle of attack of the rotor blade.

Later, U.S. Pat. No. 4,092,084 (Barltrop) disclosed a system in which the rotor blade angle with respect to a longitudinal axis was allowed to teeter. As the teeter motion occurred, a linkage coupling the two rotor blades together tended to change the angle of attack of the blades. That is, the rotor blade pitch angle varied with the rotation rate. Again, no operator control was allowed but only a variation between set limits to facilitate spinning the rotary wing up to takeoff speeds. Similarly, U.S. Pat. No. 3,149,802 (Wigal) shifts blade pitch between two angular positions dependent upon the rate of rotation. Finally, U.S. Pat. No. 3,465,705 (Bensen) discloses a system for diverting engine power to prerotate the rotary wing up to takeoff speed. The rotor blades change their angle of attack between limits according to the rate of rotation of the rotor.

In all of the foregoing patents, it appears that blade pitch varied between two positions a spin up position; and a flight position U.S. Pat. No. 2,183,119 (Larsen) employed yet another method to actuate a change in pitch from a no-lift position to a maximum-lift position by coupling a hydraulic pump to the rotation of the rotor. The hydraulic pressure developed operated several devices on the aircraft including a switch of the angle of attack of the rotor blades, between two positions.

In summary, none of the autogyro aircraft known to applicants have addressed the continuously variable control of angle of attack of the rotor blade in flight. The result of continuously variable control of the angle of attack of the rotor blade in flight, sometimes called collective pitch, is that the angle of attack can be low for spinning the blades up to takeoff speed, and then changed for maximum lift. Later, in flight at higher speeds, the angle of attack of the blades of the rotary wing is again reduced to minimize drag and allow maximum flight speed, the lift being easily adequate at such speeds.

The prior art suffers from poor spin up characteristics, traded off against takeoff characteristics traded off against flight drag characteristics. Even aircraft which allowed multiple angles of attack did not allow smooth variation between the minimum and maximum values, nor effective control of the transition therebetween. In the prior art, the blades' angle of attack is typically too large, resulting in excessive drag, for efficient spinup to takeoff speeds, yet is too small for effective lift at moderate speeds. Then, as an aircraft increases forward speed the angle of attack of the blades is too large for maximum cruising speeds, causing excessive drag. The instant invention allows infinite variation in the blades' angle of attack to create the best performance in any conditions.

Blade angle of attack is distinguishable from rotary wing angle of attack. The latter refers to the angle of the plane of motion of the entire rotary wing with respect to the relative wind passing over the aircraft. The former, as described, is the angle which the chord of an individual blade makes with respect to the relative wind. However, blade angle of attack is usually described herein from a grounded position of the aircraft so that the angle is measured between the chord and the path of the rotating blade.

SUMMARY OF THE INVENTION

The instant invention discloses a device to set the blade pitch or angle, alternately angle of attack, of a rotor blade at the desired value and maintains it throughout the 360 degree rotation. The instant invention benefits from the adjustable angle of attack without the complexity of changing it every 180 degrees. With advance and retreat, the rotor blades teeter on an axis of oscillation (teeter axis) due to the inherent dissymmetry of lift thereby flying to an equilibrium position where their upward axis of rotation cants toward the retreating side of the rotary wing. Since the invention includes a "semi-rigid rotor", such equilibrium is achieved without circumferentially hinged motion (lead/lag) or vertically hinged motion (flapping) of the rotor blade.

Rotor blades, combined to become a rotary wing when mounted on a rotor, can be rotated prior to take-off to maximum speed with minimum drag by decreasing blade pitch. The pitch is then increased to gain lift with minimum runway distance, including vertical take-off. The invention likewise provides for selection of angle of attack of the rotor blades in flight.

In addition to the substantial advance in control of blade pitch, blade angle of attack, for a rotor blade, the instant invention uncouples that angle of attack from all other motions of the rotary wing. Whenever an operator alters the attitude of the autogyro with respect to the rotary wing, the rotor blades' angle of attack is not affected although all linkages cannot go through the same center of rotation to eliminate transmission of relative motions. In the instant invention, the linkages controlling the aircraft compensate for all motions of the rotary wing with respect to the aircraft. Thus, the blade angle of attack operates independently of all other wing motions.

In the instant invention, Applicants have developed a linkage system which requires no linkage to be located within the chord of the rotor blade above the wing surface. Thus, the rotor blades of the rotary wing can be economically and precisely aligned along a line of sight down the length of the wing.

For maximum utility, the instant invention also includes a number of auxiliary systems. These include pedal controls for the operator to actuate control surfaces. Likewise, a trim and trim-mixing system for the pedal controls is disclosed herein. A joystick control and linkage is provided to carry operator actuations to the rotor head mounting the rotating wing. A self-contained prerotator system for the rotor can be engaged from the rotary wing to the engine for vertical takeoff or landing. The pre-rotator automatically disengages if the rotor overruns the speed of the prerotator.

The instant invention has overcome the difficulty of gear-up landings by providing that the main gear extend slightly below the aircraft so that a gear-up landing will have no damaging effects on the aircraft frame or fuselage. The main and nose gear also have fail-safe positions which do not rely on hydraulic support. A very compact, strong suspension system with shock mounting is used for the landing gear assembly associated with for each wheel.

The rotor head with its mechanisms to control autogyro roll and pitch, and to accommodate teetering of the rotary wing were suited for the autogyro. These features do not appear in the prior art, nor are they suggested therein.

BRIEF DESCRIPTION OF THE DRAWINGS

In the drawings, which illustrate what is presently regarded as the preferred embodiment of the invention:

FIG. 7A is a side view of the trim mixing eccentric and drag link connection arrangement of the pedal control system of FIG. 5;

FIG. 7B is a perspective view of the trim mixing eccentric of the pedal control system of FIG. 5;

DETAILED DESCRIPTION OF THE DRAWINGS

Figure 1:
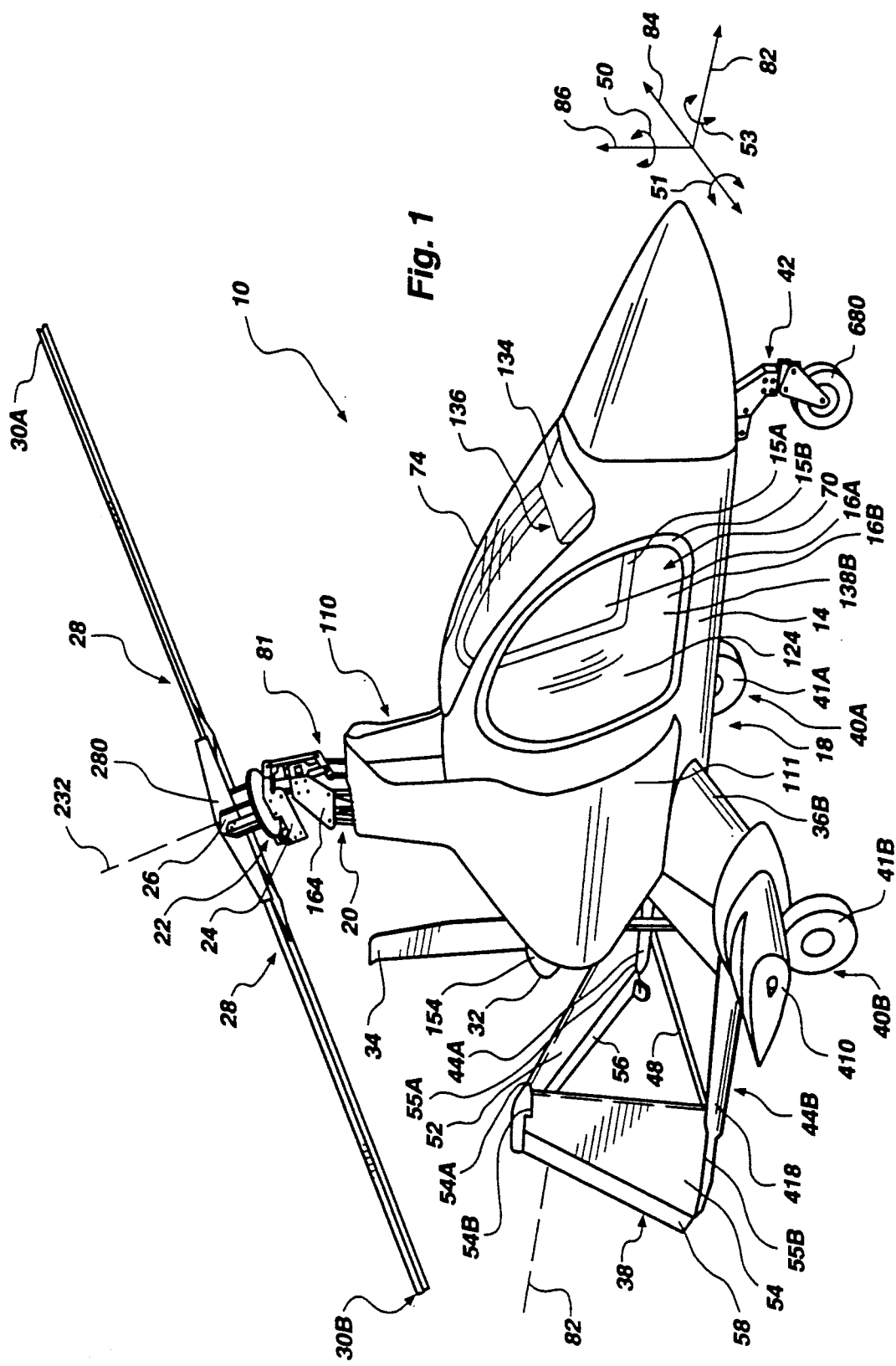
FIG. 1 is a perspective drawing of the autogyro of the invention.
Figure 2:
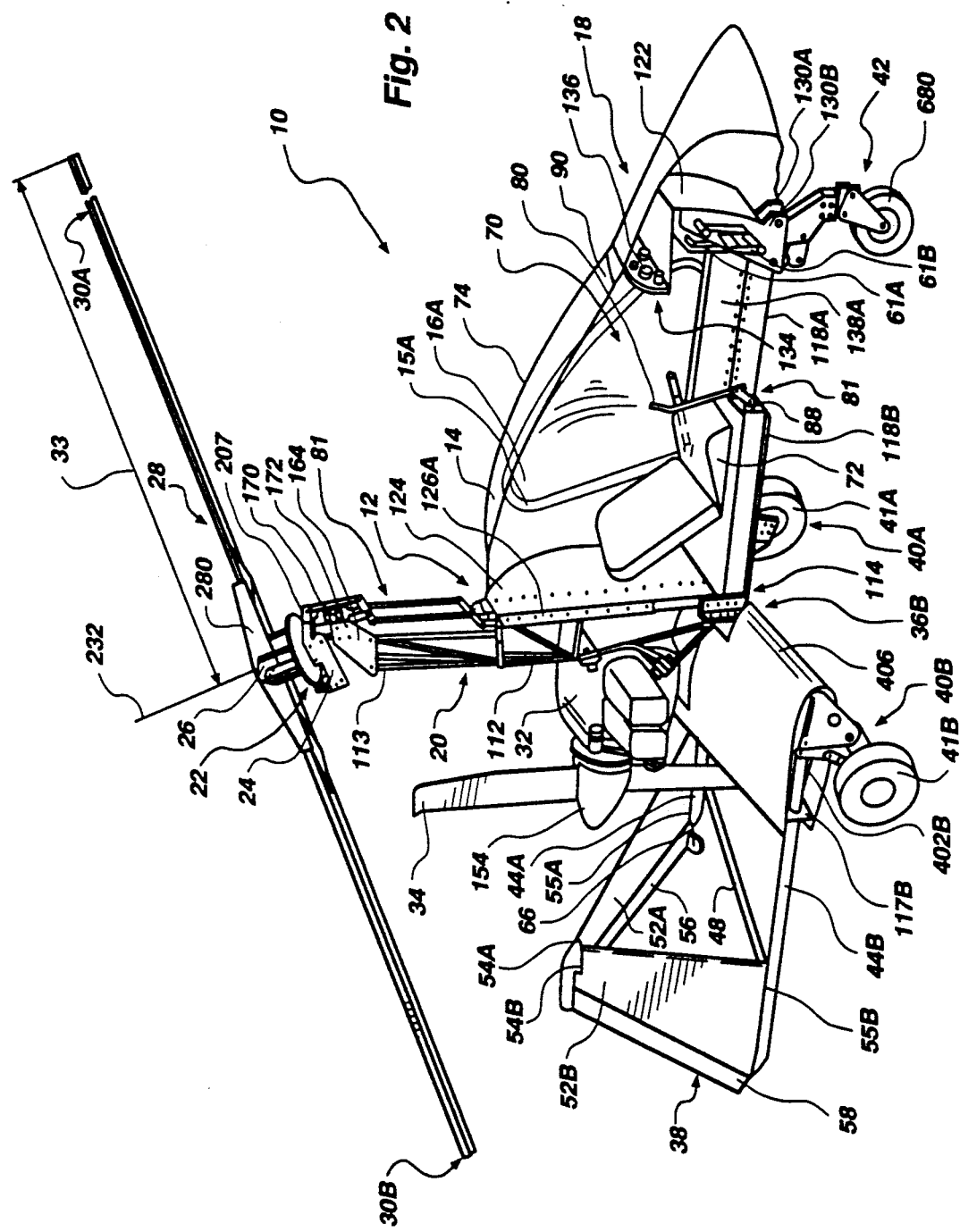
FIG. 2 is a cutaway perspective view of the autogyro of the invention.

In FIGS. 1 and 2 the autogyro 10 of the invention is shown having a frame 12 covered with a skin 14 forming the fuselage 18 of the autogyro 10. All orientations such as fore, aft, upward and downward as discussed herein relative to a pilot seated in the autogyro 10 as shown by FIG. 1. Note that the autogyro 10 illustrated may be of semi-monocoque construction of high-strength sheet metal, boxed together by attachment means such as rivets, (FIGS. 2, 2C) so that a separate and distinct structural frame element (see e.g. FIGS. 2, 2A, 3 and 4) may be minimized. The autogyro 10 has a left door 15A with a left window 16A positioned therein. It also has a right door 15B with a right window 16B therein.

The frame 12 of the autogyro 10 illustrated extends throughout the structure as necessary to provide support to components of the autogyro. Located on top of the frame 12 is a tower 20 (FIGS. 1, 2, 2B) to which is mounted the rotor assembly 22. The rotor assembly 22 is itself comprised of head 24 and a rotor 26 which rotates with respect to a head 24 to allow for roll and pitch motion between the autogyro frame 12 or fuselage 18 and the rotor assembly 22. The rotor assembly 22 also has a rotary wing 28 to provide lift for the autogyro 10. The rotary wing assembly 28 has the rotor blades 30A and 30B which are here shown only in part. That is, the blades 30A and 30B extend in length 33 a distance preselected to provide the desired lift.

Figure 2A:
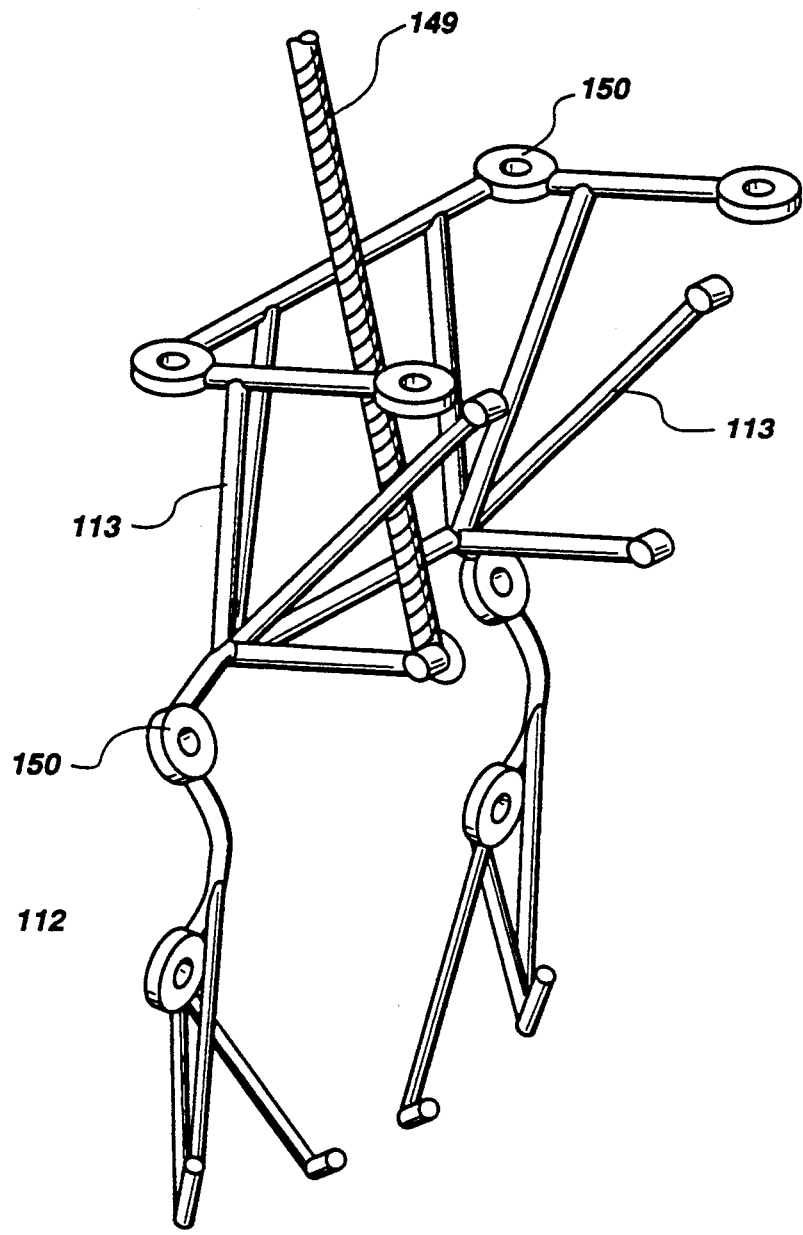
FIG. 2A is a detailed perspective view of the engine mount of FIG. 2.
Figure 2B:
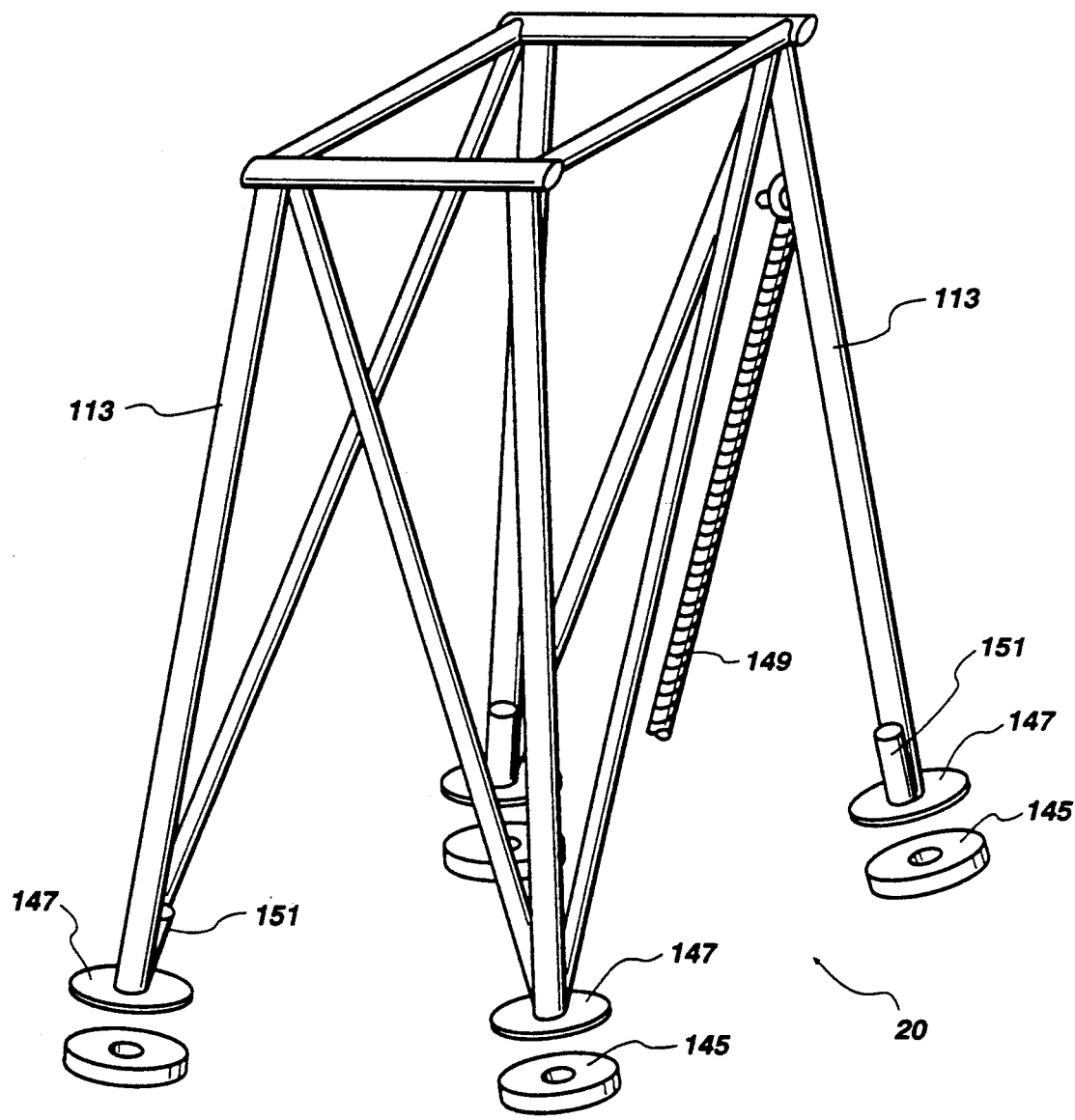
FIG. 2B is a detailed perspective view of the tower of FIGS. 1 and 2.

At the rear of the autogyro fuselage 18 an engine 32 is mounted on a structural frame, the engine mount 112 (FIGS. 2, 2A). The engine 32 rotates an airscrew, also called a propeller 34. Rotation of the propeller 34 creates thrust to move the autogyro 10 forward. Attached to the back of the frame 12 are extensions 36A, 36B, identical mirror-images of one another which extend outwardly from the fuselage 18. The left and right extensions 36A, 36B (FIGS. 1, 2, 2D) are shaped to minimize aerodynamic drag. They may also be shaped as airfoils to provide lift to the moving autogyro 10. As better seen in FIG. 1, a further extension may be provided as hereinafter discussed.

The extensions 36A and 36B and their interior structural components also serve to support the tail assembly 38 and the main gear 40A and 40B. (See FIGS. 2, 2D) The landing gear are comprised of the main gear 40A and 40B along with the nose gear 42 which together provide support for the autogyro 10 on a surface during landing or takeoff and storage. The main gear 40A and 40B and the nose gear 42 are retractable to reduce drag. However, the main gear 40A and 40B, to reduce a risk of damage to the autogyro 10 if a pilot lands with the landing gear 40A, 40B, 42 retracted, also extend slightly below the bottom surface of extensions 36A, 36B and the fuselage 18 even when retracted The tail assembly 38 has left and right booms 44A, 44B, and a cross member 48 to support the tail structure which as shown includes left stabilator 52A, a right stabilator 52B, which could be called stabilizers, since they serve that function, but are referred to here as stabilators since they are oriented at an angle between that of a conventional horizontal elevator and a conventional vertical stabilizer. Nevertheless, stabilator and stabilizer indicate the same structure and function herein The tail assembly 38 also includes a left ruddervator 56 and right ruddervator 58. The left ruddervator 56 and the right ruddervator 58 are hinged to the left stabilator 52 and the right stabilator 54, respectively, to provide yaw 50, pitch control 51 and roll control 53 of the autogyro 10 as well as to provide trim control in yaw 50, pitch 51 and roll 53 for the autogyro 10. (See FIG. 1)

The left stabilator 52A and the right stabilator 52B are fixed to each other at their upper edges 54A and 54B, respectively, which are positioned generally on a center line of the autogyro 10 with necessary adjustments to aerodynamically balance the aircraft for flight. The lower edges 55A and 55B are connected to the left boom 44A and right boom 44B, respectively. The booms 44A and 44B and stabilators 52A and 52B, with the cross member 48, form a triangulated structure of optimum strength and stability as the tail assembly 38. Notably, the tail assembly 38 has left ruddervator 56 and right ruddervator 58 which act as both elevator and rudder. In the configuration presented, the ruddervators 56 and 58 in the tail assembly 38 are located at the back of an upside down "V" formed by the left stabilator 52A and right stabilator 52B, as illustrated in FIGS. 1 and 2. The arrangement provides for increased structural rigidity while placing the control surfaces, ruddervators 56 and 58, in the direct path of the air coming from the propeller 34, thus providing enhanced maneuverability.

The air from the propeller moves rearwardly in a spiraling counterclockwise direction from a position in airflow called the slipstream behind the propeller. Thin stabilators 52A and 52B by their inverted "V" structure intercept the spinning air of the slipstream as it comes from the propeller. The air strikes the upper side of left stabilator 52A and the underside of right stabilator 52B causing the tail assembly 38 to have a torque about the roll axis 82 helping to counteract engine torque.

The left stabilator 52A and right stabilator 52B are each formed as airfoils to reduce drag and improve the performance of the control surfaces, ruddervators 56 and 58. The ruddervators 56 and 58 operate upon movement of the pedal control system 60, containing left pedal 61A and right pedal 61B (See FIGS. 2 and 5) in a manner understood by those skilled in the art.

Because of the position of the apex of the tail assembly 38 in the center of the slipstream of the airflow, the left and right ruddervators 56 and 58 act not only as yaw control but provide roll control also. Although principal roll 53 control comes from the position of the rotary wing assembly 28 with respect to the fuselage 18, application of ruddervator control to left and right ruddervators 56 and 58 provides yaw 50 and roll 53 control to the aircraft. The advantage of this feature is that at high power, slow speed flight, such as takeoff, force on left pedal 61A will completely compensate for roll 53 effects of engine torque. When the pilot pushes the left pedal 61A forward, the left ruddervator 56 moves upward while right ruddervator 58 moves downward. This imparts a counterclockwise or left roll 53 to the aircraft, countering the engine's clockwise torque which imparts a right roll 53 to the aircraft.

Figure 5:
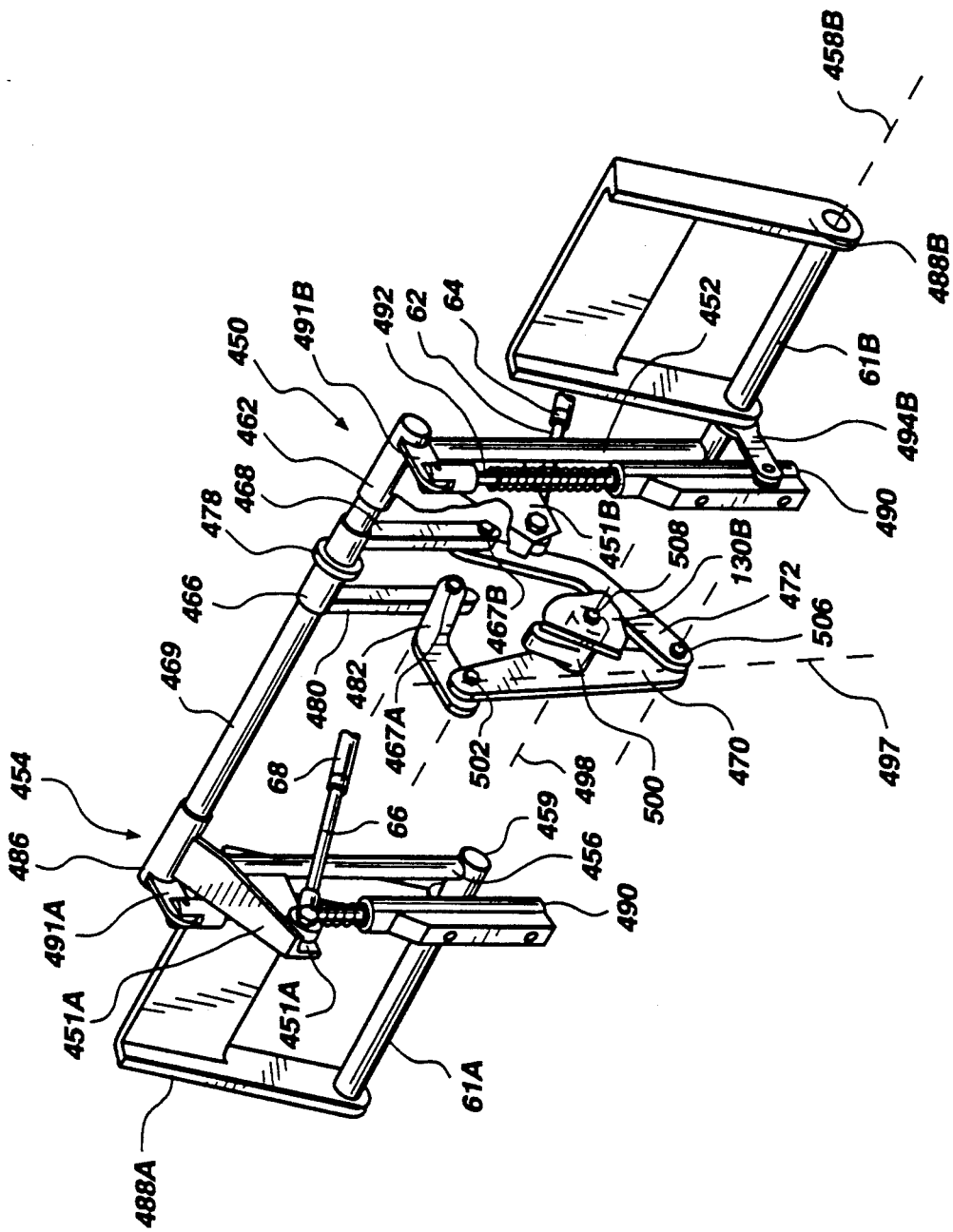
FIG. 5 is a perspective view of the pedal control system for controlling the ruddervator and wheel brakes of an autogyro of the invention.
Figure 6:
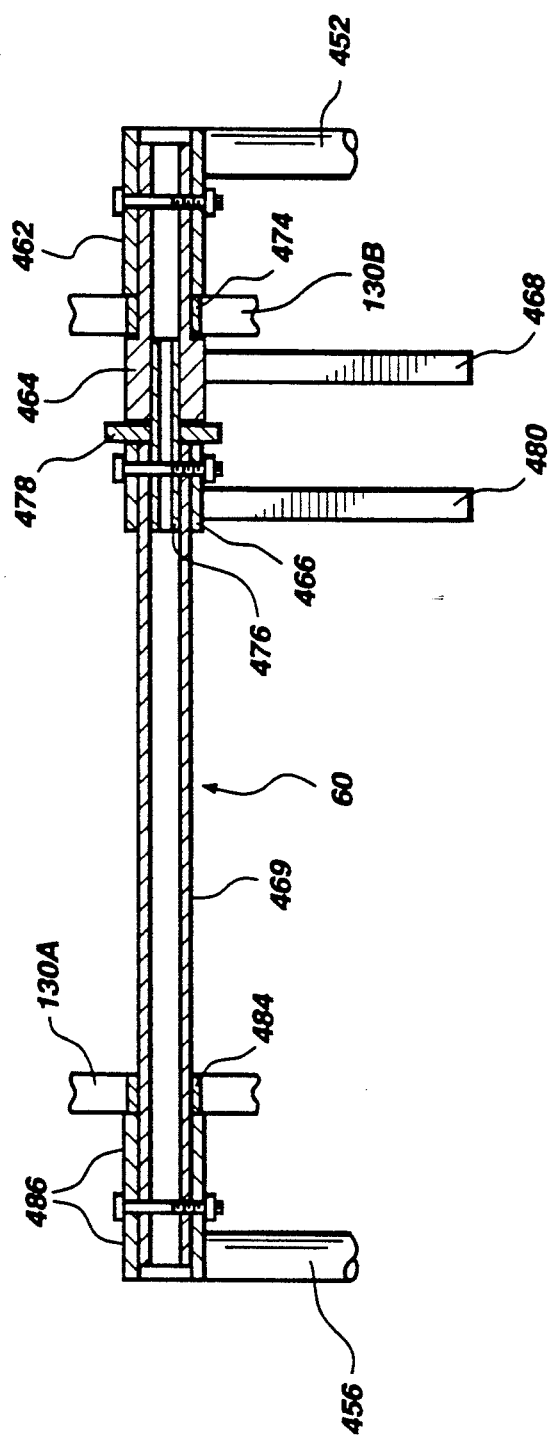
FIG. 6 is a cross-sectional view of the rotational and fixed connection arrangement of the pedal control system of FIG. 5.

In FIG. 2 but more particularly referencing FIGS. 5 through 8B, the left ruddervator 56 of FIG. 2 and the right ruddervator 58 are controlled from the pedal control system 60 of FIG. 6 by means of right pedal 61B and left pedal 61A of FIG. 5 actuating, respectively, a right pedal push-pull cable 62 operating inside a right push-pull cable casing 64 to operate the right ruddervator 58 with a left pedal push-pull cable 66 inside a left push-pull cable casing 68 to operate the left ruddervator 56.

The pedal control system 60 is located near the front of the cockpit 70 for operation by a user. The cockpit 70 is an area within the frame 12 equipped with a seat 72 to support a user (pilot) therein. A windshield 74 is secured to the fuselage 18 to be a front upper surface thereto. The windshield 74 is preferably made of a transparent material so that the pilot may see out of the autogyro 10. Left and right doors 15A, 15B are also made of a transparent plastic material on contain windows 16A, 16B to facilitate external vision.

Inside the cockpit 70 and in front of the seat 72 is the stick 80 of the stick control system 81 which is used by the pilot to control the attitude (orientation) of the rotor assembly 22. The stick control system 81 has a stick 80 positioned for grasping and manipulation by the user in the cockpit 70. The lower end of the stick 80 of the stick control system 81 is attached to the autogyro 10 to extend into the control tunnel 88. The lower end of the stick 80 is interconnected by a system of rod and lever structures further shown in FIG. 24 to move the rotor assembly 22 with respect to the frame 12 about the roll axis 82 and pitch axis 84.

The stick 80 is thus used to control the autogyro 10 about its roll axis 82 and its pitch axis 84. Similarly, the left ruddervator 56 and the right ruddervator 58 are used to rotate the frame 12 of the autogyro 10 about the yaw axis 86. The control tunnel 88 (FIGS. 2, 2C) is an area within the frame 12 which is designed to receive linkages connecting the stick 80 with the head 24. The control tunnel 88 also houses right push-pull cable 62, left push-pull cable 66 (FIGS. 2, 2E, 5) and other elements of other flight control systems run therein between the cockpit 70 and the rotor assembly 22 and the tail assembly 38.

Figure 9:
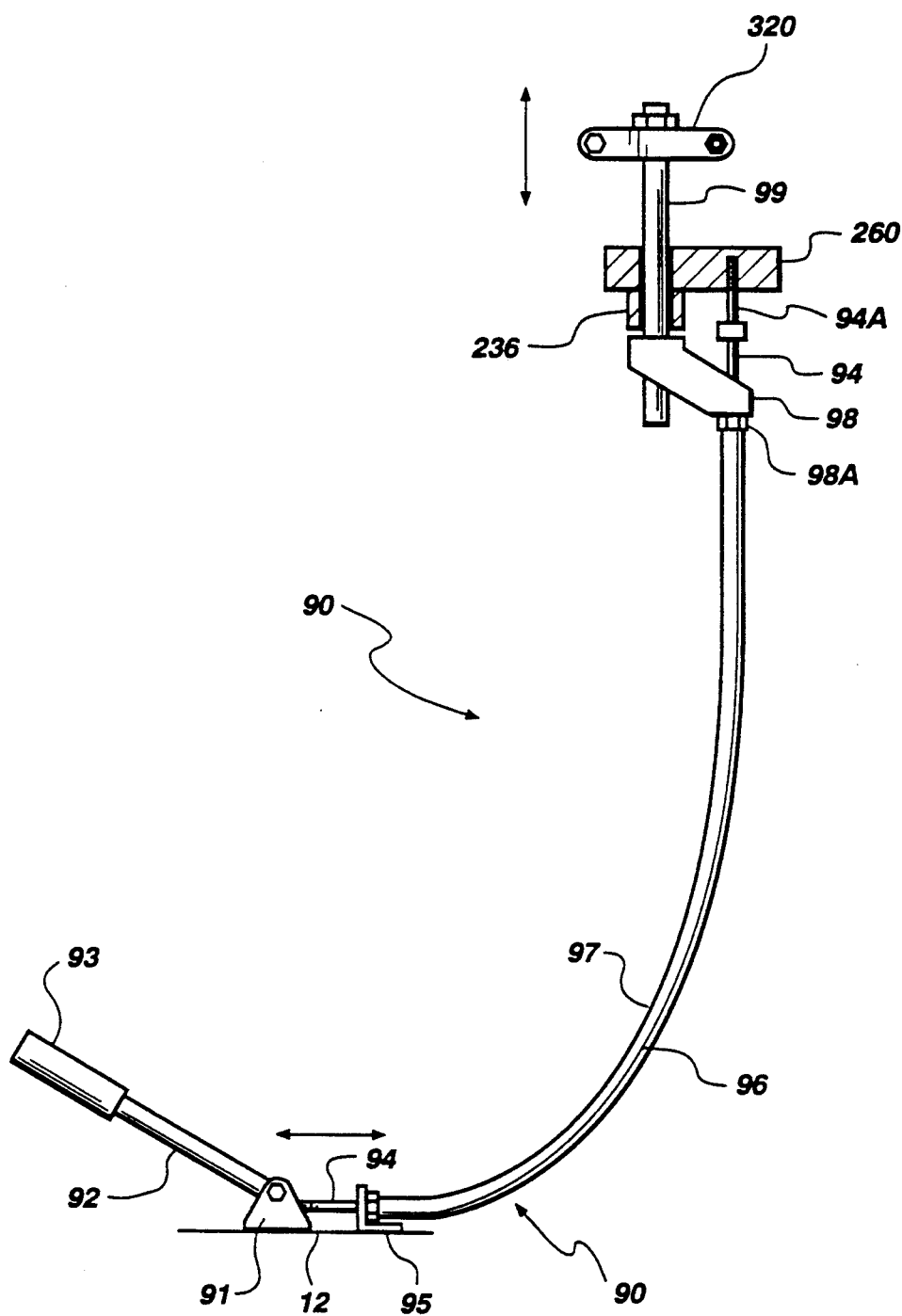
FIG. 9 shows the collective pitch assembly of the instant invention.

In FIG. 9, the collective pitch system 90 controls the flight characteristics of the rotor blades 30A, 30B from within the cockpit 70. As better seen in FIGS. 9-13, the collective pitch system 90 is comprised of a collective mount 91 rotatably supporting a collective arm 92 which operates as a lever for the pilot who grasps the collective handle 93 to control the angle of attack of the rotor blades 30A and 30B. The collective arm 92, in turn, is connected to and actuates the collective push-pull cable 94. The cable casing bracket 95 retains a collective casing 96, through which the collective push-pull cable 94 runs, for protection from abrasions or impediments in its motion, and for actuation purposes as discussed below. The collective push-pull cable 94 terminates in a solidly mounted, collective push-pull cable termination 94A. The collective casing 96, by virtue of a flexible turn 97 at some location along its length also operates as an actuation device by terminating in a collective block 98 moveable in response thereto, as explained below, fastened by a retaining means 98A, at its end nearest the rotor assembly 22, which collective block 98 is free to move and is not restrained by being mounted to either the rotor assembly 22 or the tower 20.

Figure 14:
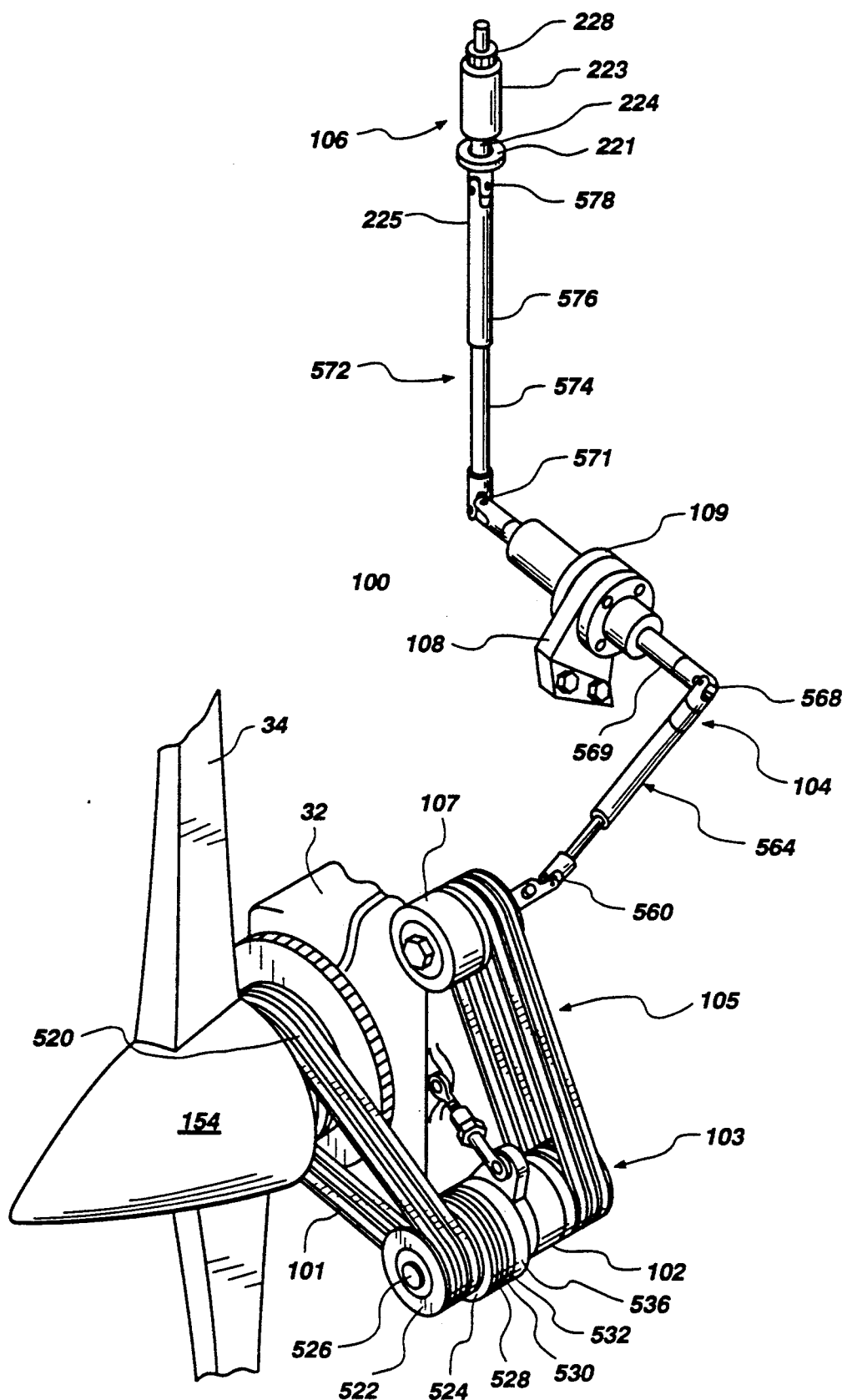
FIG. 14 is a perspective view of the prerotator system of the invention.

In FIG. 14, with further details in FIGS. 15-20, a pre-rotator system 100 is shown for transferring power from the engine 32 at the command of the operator to rotate the rotor blades 30A and 30B. The prerotator system 100 has a clutch assembly 102 mounted to the engine 32 or frame 12. The prerotator system 100 receives power from the engine 32 by one or more belts 101 as shown. Even though belts 101 are here preferred for limiting transmission of mechanical vibration, stress, and shock, a gearing arrangement may be used if carefully and properly designed. The clutch assembly 102 is operable by the user to engage or disengage pulleys 103 to in turn drive belts 105. That is, before flight the blades 30A and 30B are not turning In order to rotate the blades 30A and 30B at a desired rate to facilitate take off, the clutch assembly 102 is engaged to transmit power from the engine to rotate the blades 30A and 30B.

Figure 15:
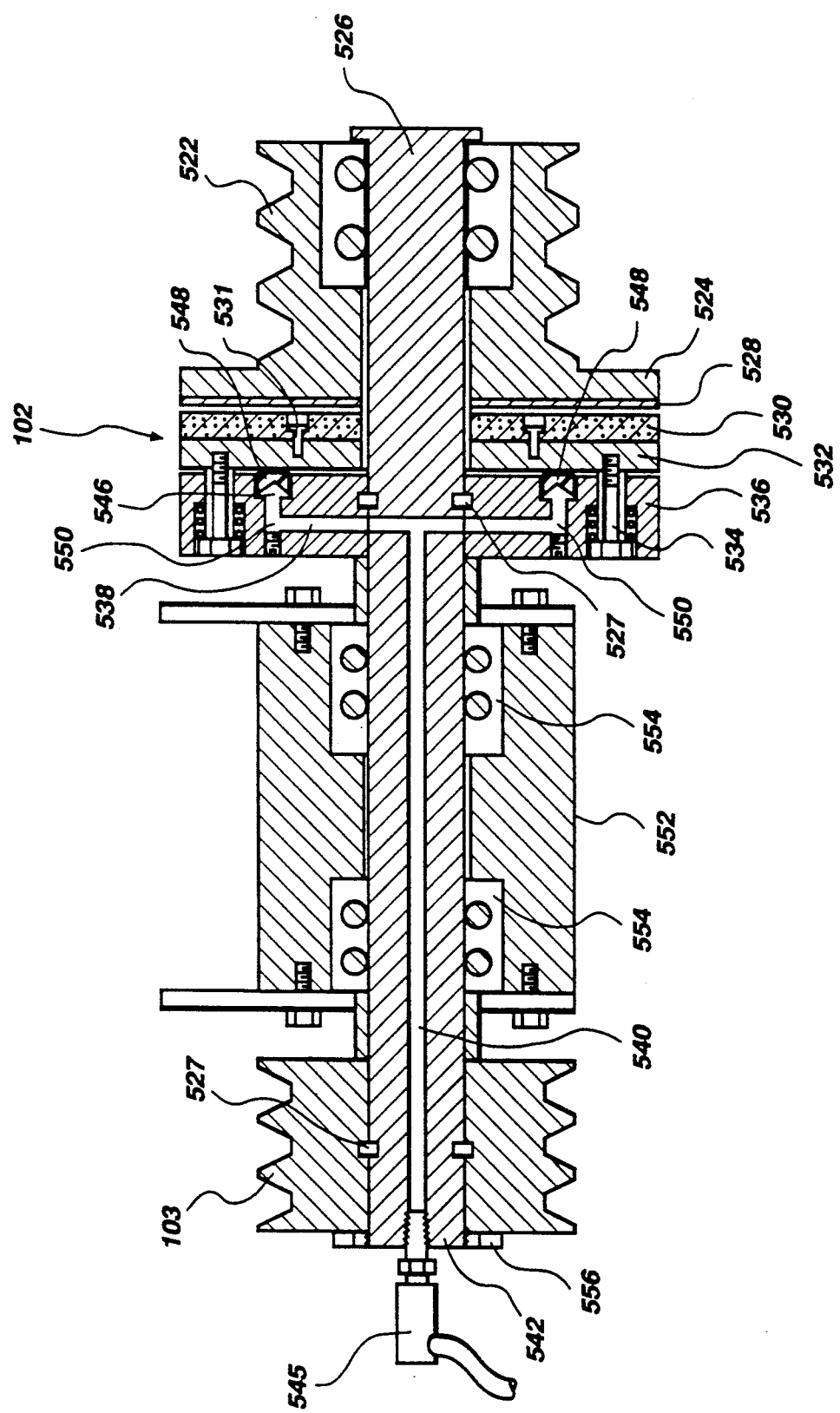
FIG. 15 is a cross-section of one embodiment of the pre-rotator clutch of the prerotator system of FIG. 14.
Figure 16:
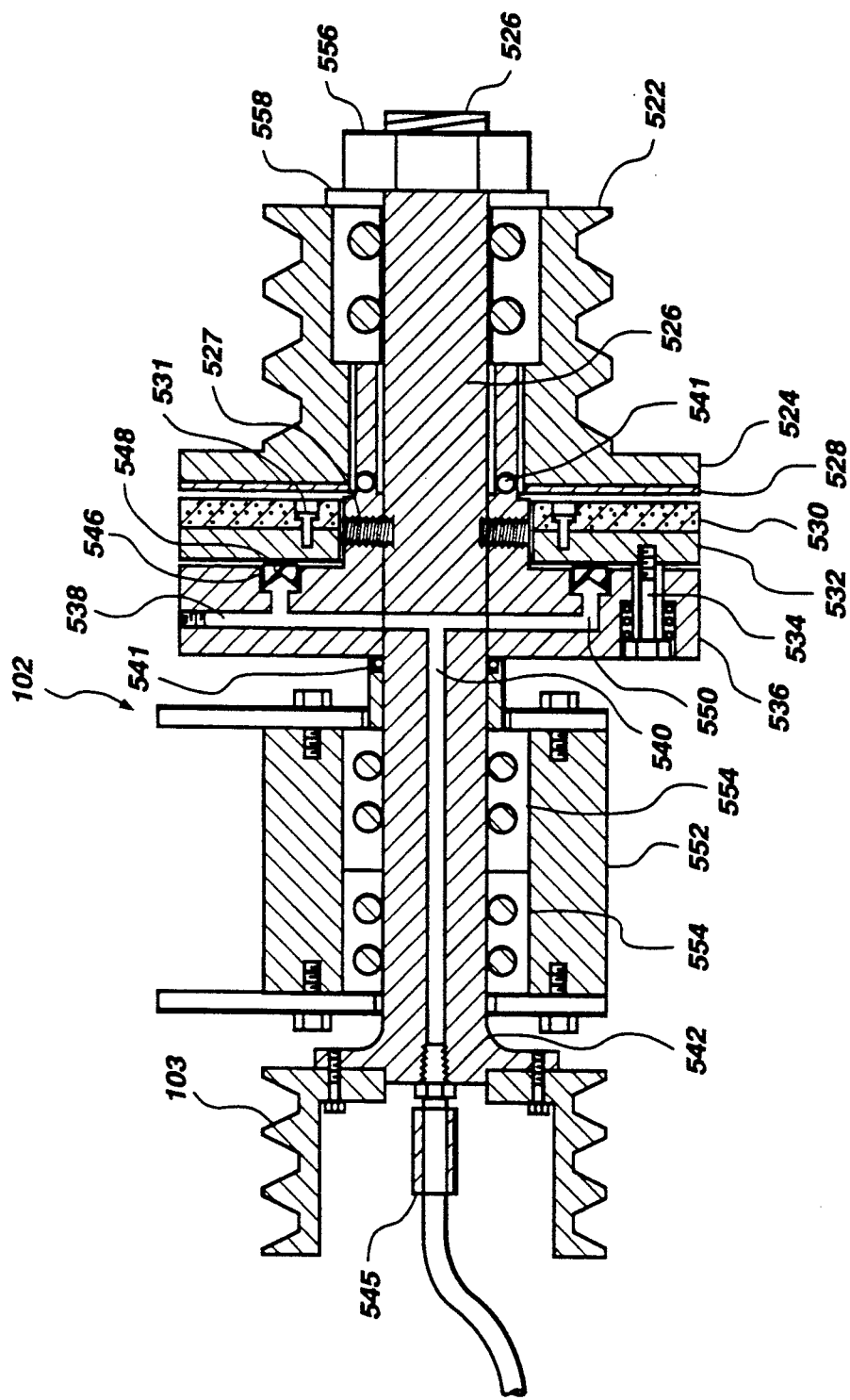
FIG. 16 is a cross-section of the preferred embodiment of the prerotator clutch of the prerotator system of FIG. 14.

The clutch assembly 102 here shown in FIG. 14 is further illustrated in FIGS. 15 and 16. The device of FIG. 16 is the preferred embodiment.

The clutch assembly 102, and more particularly the drive pulleys 103, drive the speed transfer 107 with drive belts 105. The pulley 103 increases the rotation rate of, and drives, a prerotator linkage assembly 104 at a desired rotation rate selected to provide the desired lift to facilitate take off. The rotation rate is correlated with the size, particularly length 33, of the blades 30A and 30B as well as to the weight of the aircraft.

The prerotator linkage assembly 104 (See FIG. 14) extends from the speed transfer 107 to a head drive 106 mounted on the head 24 to deliver rotating power to the rotor 26. The prerotator linkage assembly 104 is supported by a prerotator linkage bracket 108 holding a prerotator carrier bearing 109 in which the prerotator linkage assembly 104 is free to rotate. The prerotator linkage bracket 108 is mounted to the tower 20 or engine 32 to support the weight of the prerotator linkage assembly 104 and prerotator carrier bearing 109.

As a means to cool the autogyro's engine 32, a cowling 110 is formed with the fuselage 18 and the tower 20 to direct an airflow over the cooling fins of the engine 32. As seen in FIG. 1, the fuselage 18 forms the interior surface of the cowling 110, and a separate cowling member 111 forms the exterior surface. The cowling member 111 is spaced from the fuselage 18 on each side to duct air back to and over the engine. The cross-sectional area between the cowling member 111 and fuselage 18 is selected to provide sufficient airflow for cooling, and in some applications a vane or damper system may be placed between them to regulate the airflow.

In FIGS. 2, 2A, 2B, 3 and 4, the autogyro frame 12 includes an engine mount 112, composed of struts 113 which are rigid members of appropriate cross-sectional shape assembled in a desired rigid geometric configuration to provide maximum strength at minimum weight. The struts 113 are preferably assembled in a triangulated fashion using high-strength tubular metal, alloys of steel or aluminum, to support the tower 20 and the engine 32.

The frame 12 with the fuselage 18 is preferably manufactured in a monocoque module 114 comprising a series of ribs 116 (See FIG. 2C) and a left tunnel beam 118A and a right tunnel beam 118B. The skin 14 is secured thereto to form a rigid and strong structure.

The frame 12 also contains a front wall 122 and a rear fire wall 124. The rear fire wall 124 is structurally strengthened by left vertical rails 126A and a right vertical rail 126B (not shown) oppositely matched and preferably made of angle-shaped metal.

Figure 2C:
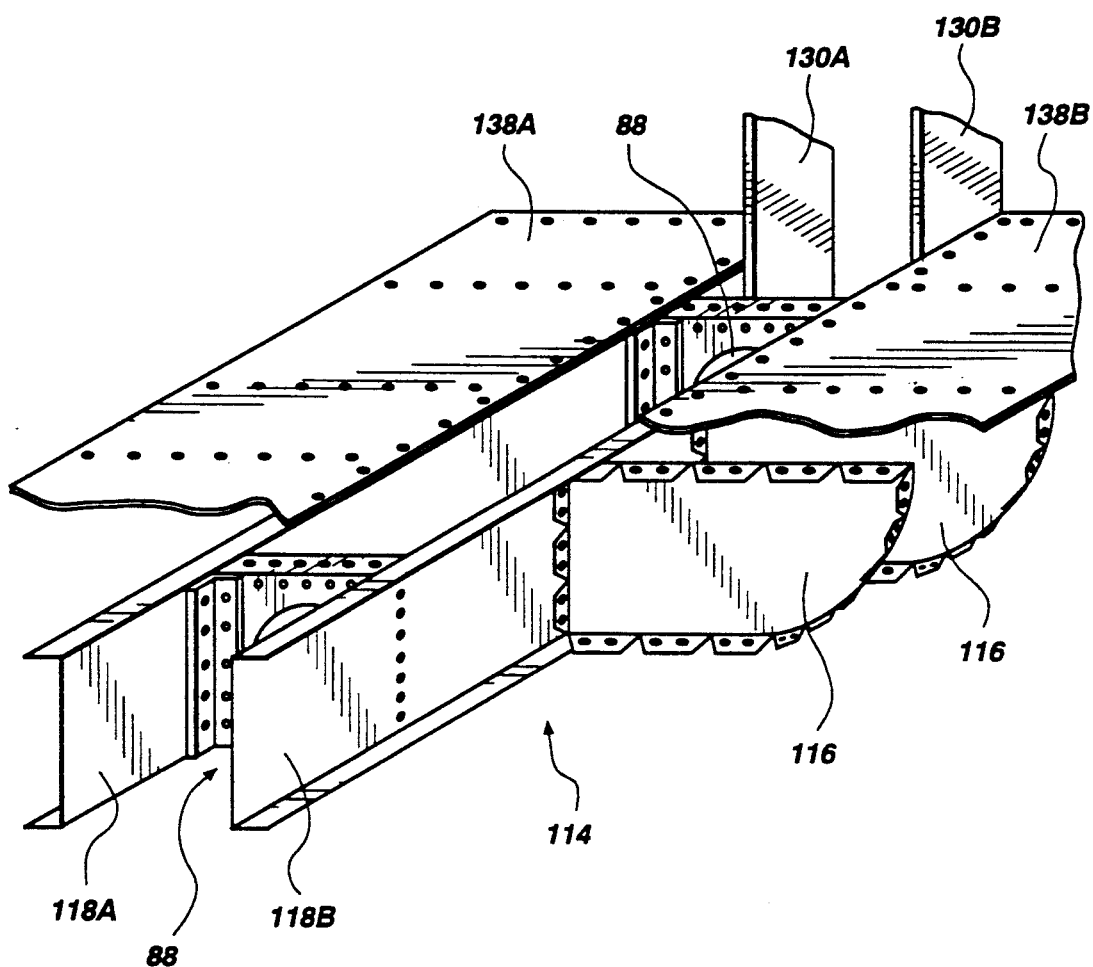
FIG. 2C is a detailed perspective cut-away view of the floor, ribs and control tunnel of FIG. 2.
Figure 2D:
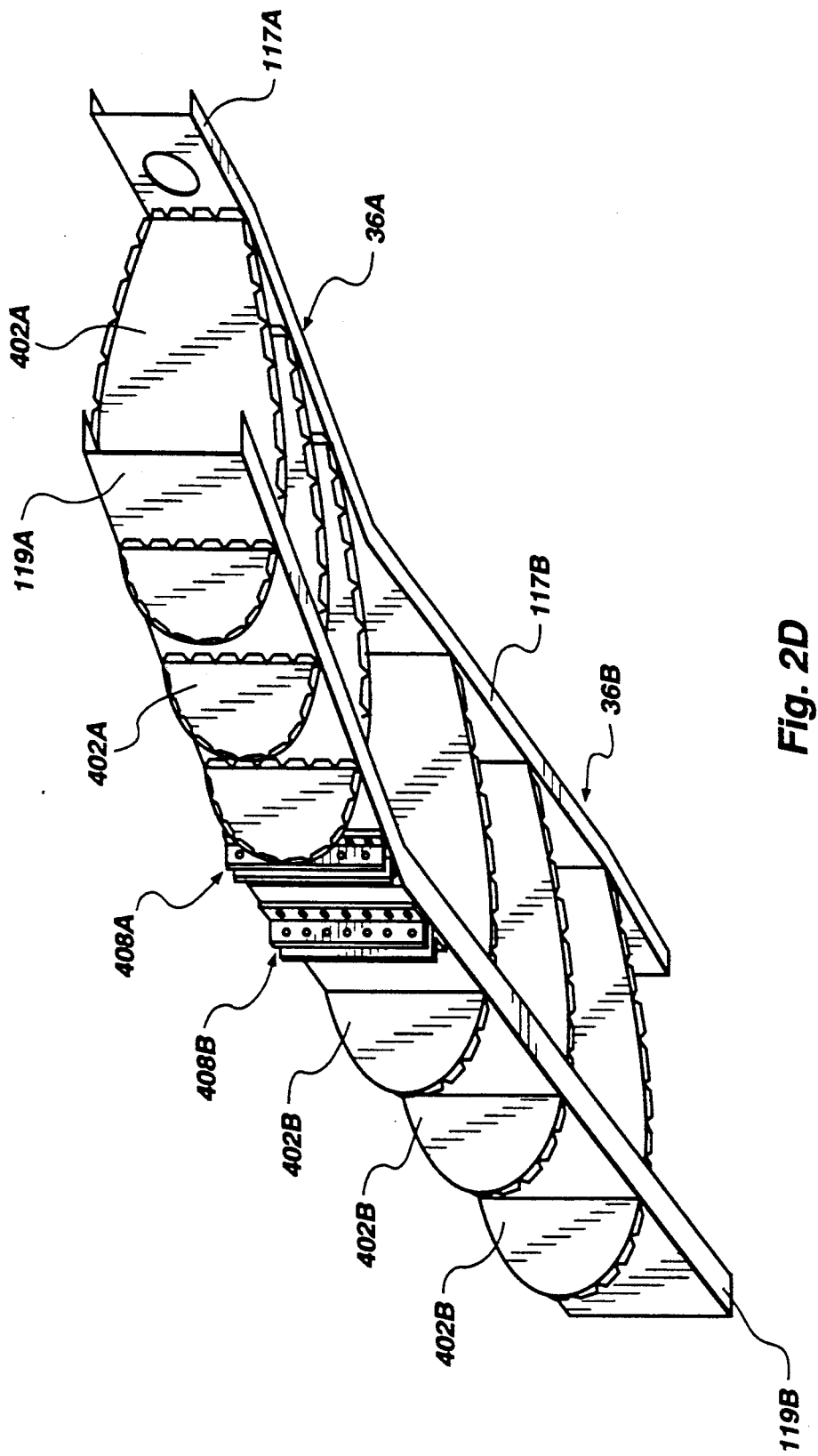
FIG. 2D is a detailed perspective view of the spars and ribs of the extensions in FIGS. 1 and 2.

In FIGS. 2 and 2C mounted to the left tunnel beam 118A and the right tunnel beam 118B and also fastened against the front wall 122 is a pair of plates comprising a left and a right tunnel plate 130A, 130B each mounted vertically against the left and right tunnel beams 118A, B, respectively. Mounted above the tunnel plates 130A, 130B, fastened to the front wall 122 and extending between the left side and right side of the cockpit 70 is a console 134. The console 134 holds and displays the flight instrument group 136. Typical instruments will include an altimeter, an attitude indicator, a vertical speed indicator, a turn and bank indicator and an airspeed indicator. The flight instrument group 136 may also include various engine instruments including RPM, vacuum, oil pressure, oil temperature and exhaust or cylinder temperature. Various radio and navigation units are also included in the console 134.

Extending from the front wall 122 to the rear fire wall 124 on the right side of the cockpit 70 is the right floor 138B which serves as part of the structure of the monocoque module 114 by being attached to the ribs 116. Similarly, on the left side of the cockpit 70 extending between the front wall 122 and the rear fire wall 124 and attached similarly to the left tunnel beam 118A is the left floor 138A. The left and right floor 138A, 138B support the pilot in the cockpit 70. The seat 72 is fixedly or preferably adjustably mounted to the floor 138A, 138B or tunnel beams 118A, 118B.

The ribs 116, left and right tunnel beams 118A, 118B and skin 14 as well as all other components of the monocoque module 114 are fastened fixedly, preferably by riveting, to form the monocoque module 114 of the frame 12. Likewise, the windshield 74 is fixedly attached to the skin 14 at the upper front region of the cockpit 70. In the preferred embodiment, the side windows 16A and 16B are virtually the entire left door 15A and the entire right door 15B. Alternately, windows 16A and 16B might be only a portion of the left door 15A and right door 15B. The left door 15A and right door 15B are hingedly attached to the frame 12 or fuselage 18 preferably near their front edges 17A (not shown) and 17B.

In FIGS. 2 and 2A the engine mount 112 of the frame 12 is fixedly attached, preferably by bolts to the left and right vertical rails 126A, 126B of the monocoque module 114. The engine mount 112 is comprised of a plurality of struts 113 fastened together rigidly, preferably by welding, and further fastened at the top of the engine mount 112 with shock mounts 144 preferably of the type called Lord mounts. (See FIGS. 3 and 4) The shock mounts 144 are arranged substantially in a rectangle to be located at the right front, right rear, left rear, and left front of the top of the engine mount 112. The shock mounts 144 contain a shock pad 145 of rubber or a similar sound and vibration isolating material. Bolts 146 and various washers 147 of suitable shapes retain the shock pad 145 in a depression 148 integral to an outer ring 150. The shock mounts 144 are used to make attachments between materials as needed for vibration isolation in any application.

Figure 3:
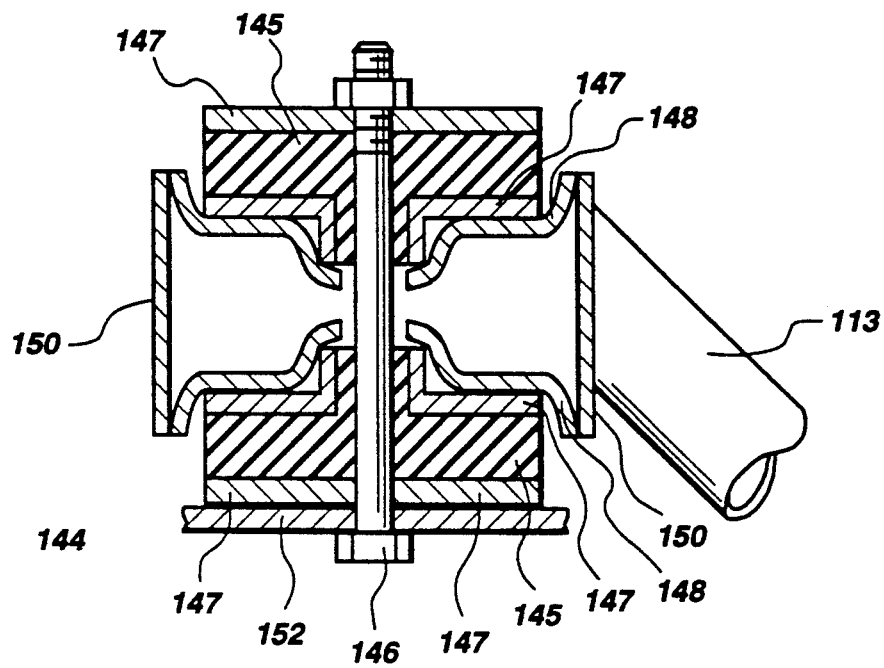
FIG. 3 is a cross section of an assembled shock mount with a strut and plate attached.
Figure 4:
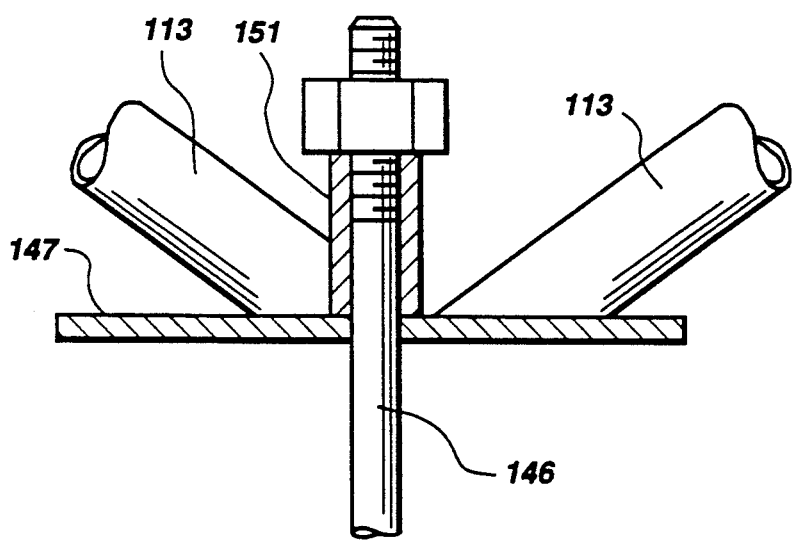
FIG. 4 is a cross section of washers and mounting hardware of a shock mount attached to the struts.

As shown in FIGS. 3 and 4, some struts 113 are mounted directly to the outer ring 150, while others are attached to the washers 147 or sleeves 151 fastened to the washers 147. Likewise, any structural member 152 may be fastened by the bolt 146 itself of a shock mount 144. Also, a structural cable 149 is connected in tension between the engine mount 112 and the tower 20 to keep the shock mounts 144 from being in tension during flight.

At the rear of the engine mount 112 are shock mounts 144 which are there arranged in a substantially rectangular pattern to match the mounting structure or hole pattern of the engine 32. Shock mounts 144 are disposed about a vertical plane to be in an upper right, lower right, lower left, and upper left location with respect to each other. The shock mounts 144 connect the engine 32 and the engine mount 112 by bolts 146. In the shock mounts 144, shock pads 145 of elastomeric material absorb, attenuate, or otherwise reduce stress and vibration between the engine 32 and engine mount 112 and other parts of the frame 12. (FIG. 3).

In FIG. 2, the engine 32 in the preferred embodiment is a conventional aircraft engine, known in the art, disposed to have its crankshaft extending rearward to drive the propeller 34. Similarly, the propeller 34 in the preferred embodiment is known in the art. A propeller cowling 154, alternately referred to as a spinner, is positioned rearward of the propeller 34 in a manner well known within the art.

In FIGS. 1, 2 and 2B, the tower 20 is fabricated by the same strut type construction as the engine mount 112. The tower 20 has a multiplicity of shock mounts 144 built into it (FIG. 3) formed to mate with the engine mount 112. (FIG. 2A) The tower 20 is comprised of an assembly of struts 113 triangulated to give maximum strength and rigidity with minimum weight. The tower 20 is secured to the engine mount 112 by suitable bolts 146 in the shock mounts 144, as per aviation standards.

Figure 17:
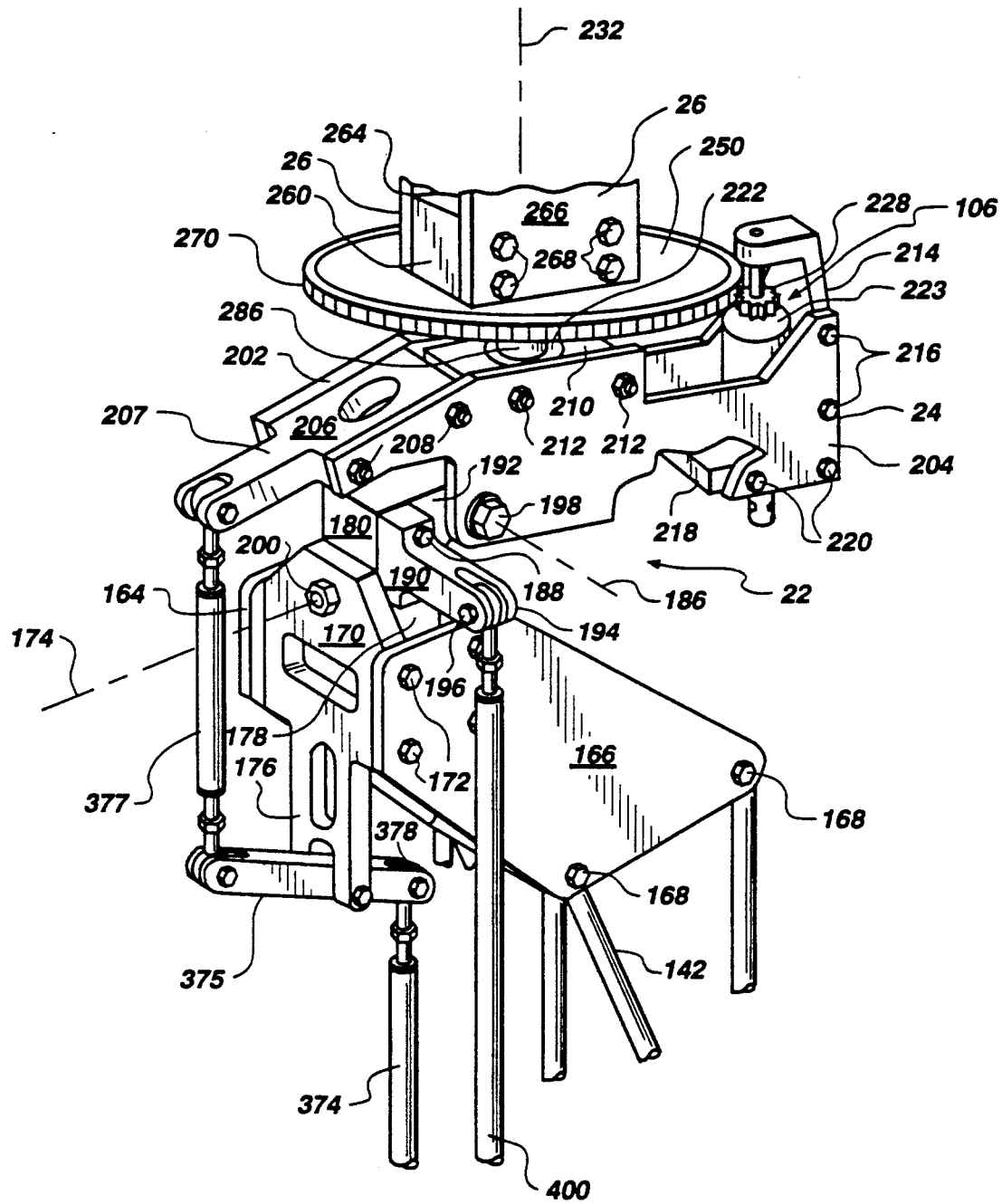
FIG. 17 is a perspective view of portions of the head and rotor assemblies of the invention.
Figure 18:
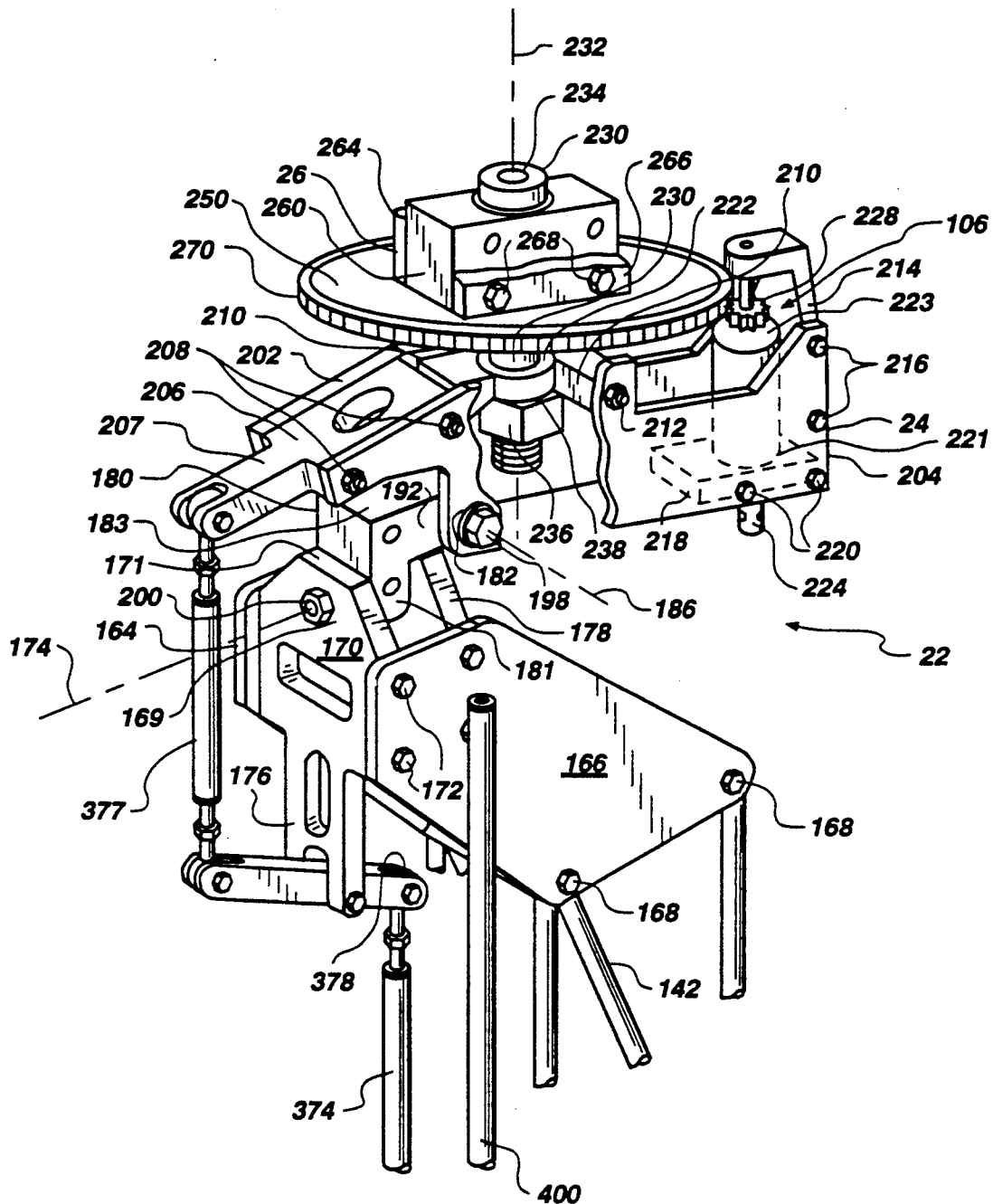
FIG. 18 is a cutaway perspective view of the head and rotor assemblies of FIG. 17.

In FIGS. 1, 2 and as better seen in FIGS. 17 and 18, a right tower cheek plate 164 and a left tower cheek plate 166 are fixedly attached to the top of the tower 20 by means of tower cheek plate bolts 168. The right tower cheek plate 164 and the left tower cheek plate 166 extend above the tower 20 and provide structural support and mounting locations for the rotor assembly 22. A front tower block 170 is fixedly attached between the right tower cheek plate 164 and the left tower cheek plate 166 by a multiplicity of tower block bolts 172.

The front tower block 170 has an aperture 169 formed through the block's face near its upper edge 171. The axis 174 of the aperture 169 is the universal roll axis. The lower extremity of the front tower block 170 extends below the right tower cheek plate 164 and the left tower cheek plate 166 to form the front tower block yoke 176. The yoke 176 serves as a bracket to receive control structure more fully discussed hereinafter.

Spaced apart from the front tower block 170 and likewise fastened between the right tower cheek plate 164 and left tower cheek plate 166 is the rear tower block 178 shown in FIG. 18 only in partial phantom outline for clarity. The block 178 likewise has an aperture 179 along the universal roll axis 174. The rear tower block 178 is likewise fixedly attached between the right tower cheek plate 164 and the left tower cheek plate 166 by means of tower cheek plate bolts 172.

Between the front tower block 170 and the rear tower block 178 is located the universal element 180 which likewise has an aperture (not shown) for and aft through its lower extremity along the universal roll axis 174 to function as a roll journal. The universal element 180 is made of a structurally strong material, preferably metal with high fracture toughness, formed to be "L"-shaped with a lower leg 181 (now shown) and an upper leg 183 of the "L" disposed fore and aft between the front tower block 170 and the rear tower block 178. The lower leg 181 extends downwardly from the upper leg 183 to mate with the roll arm 190. Another aperture 182 is formed left to right through the upper leg 183 of the universal element 180 to function as a pitch journal, the center of which is the universal pitch axis 186. Fixedly attached by the universal bolts 88 is the roll arm 190 mounted to the universal side face 192 by means of the universal bolts 188. In FIG. 17 a roll arm yoke 194 is formed in the outward end of the roll arm 190. The roll arm yoke 194 forms a slot with a bolt aperture formed to receive roll arm yoke bolt 196 to connect the linkage 400 within the roll arm yoke 194 as more fully discussed hereinafter.

Figure 19:
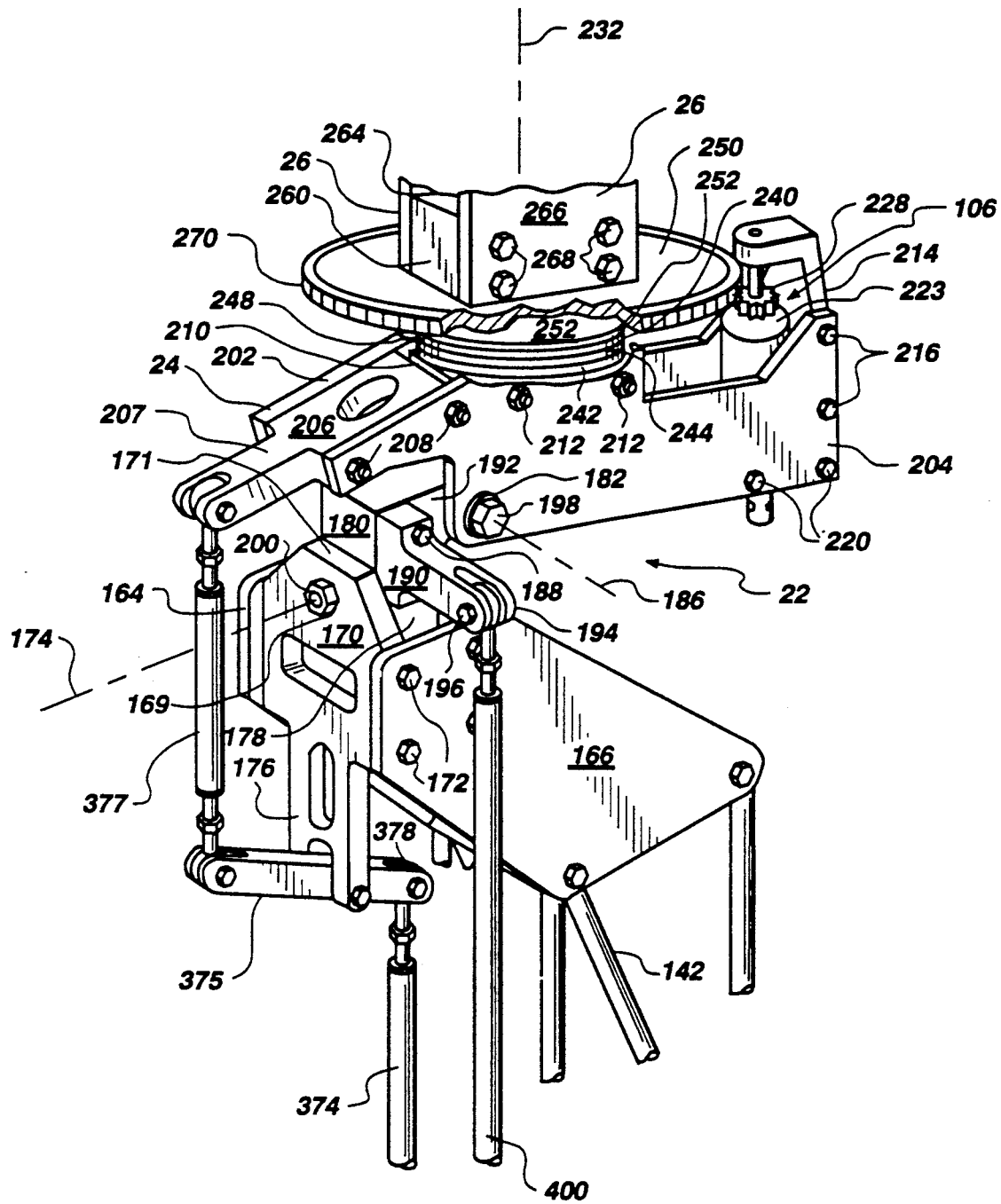
FIG. 19 is a perspective view of the rotor brake on the rotor assembly of the invention.

In FIGS. 17-19, the head 24 is shown mounted to the universal element 180 by means of a head pitch axle bolt 198 positioned through the universal element 180 to rotate about the universal pitch axis 186. A corresponding head roll axle bolt 200 retains the universal element 180 between the front tower block 170 and rear tower block 178 along the universal roll axis 174. The universal element 180 is also retained between the right head cheek plate 202 and the left head cheek plate 204 (shown in cut-away in FIG. 18) by the head pitch axle bolt 198 which in effect connects the rotor assembly 22 to the aircraft frame 12.

The right head cheek plate 202 is spaced apart from the left head cheek plate 204 by a front head block 206 located at the front extremity of the head and retained therein by a multiplicity of front head block bolts 208. The right and left cheek plates 202 and 204 are also spaced apart by a head bearing block 210 retained therein by a multiplicity of head bearing block bolts 212, some of which are not shown for clarity. The cheek plates 202 and 204 are also spaced apart by a rear head block 214 retained by a multiplicity of rear head block bolts 216. The cheek plates 202 and 204 are also spaced apart by a bendix bearing block 218 which is secured to the cheek plates 202 and 204 by bendix bearing block bolts 220. The front head block 206 and the rear head block 214 serve to space apart the right head cheek plate 202 from the left head cheek plate 204 and to provide for structural rigidity of the head 24. The head bearing block 210 and the bendix bearing block 218 likewise serve a function similar to the front and rear head blocks 206 and 214 and, in addition, support a bearing assembly as discussed hereinafter.

In reference to FIGS. 14 and 18, the head drive 106 has a bendix 223 which contains a bendix input shaft 224 which extends through the bendix bearing block 218. The bendix input shaft 224 is formed to connect with the upper end 225 of the prerotator linkage assembly 104. The bendix input shaft 224 engages and drives the spur gear 228 to extend and rotate as known in the art.

The bendix bearing block 218 holds the bendix bearing 221 to support the bendix 223. The bendix 223 is engaged prior to takeoff to rotate the rotor 26 to takeoff speeds (RPM) and to maintain takeoff speed (RPM) until disengaged by the pilot just before the autogyro 10 makes takeoff, relying on forward motion to rapidly induce autorotation of the blades 30A and 30B. The bendix 223 disengaged by operation of the clutch assembly 102. Also, the rotor 26 is disengaged by the bendix 223 automatically in the event that the rotor 26 begins spinning faster than the prerotator system 100 is driving it.

Figure 20:
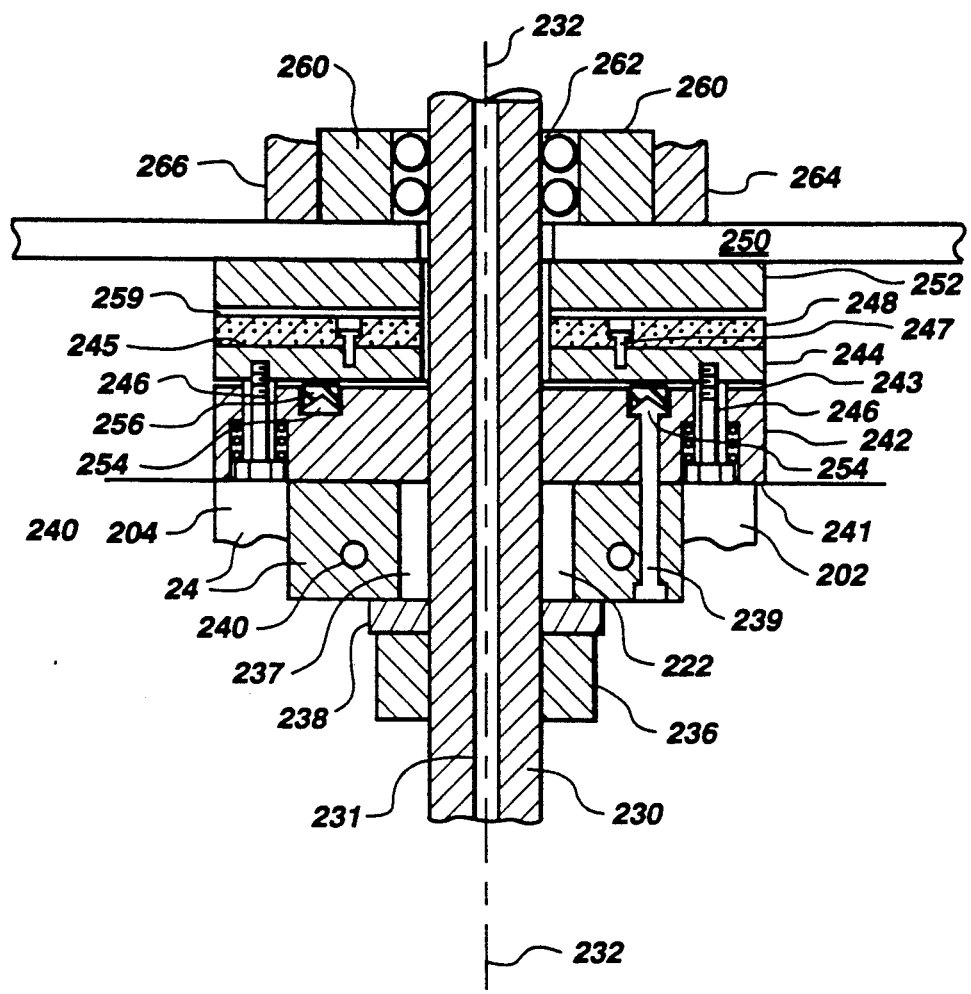
FIG. 20 is a cross-sectional view of the rotor brake of FIG. 19.

As better seen in FIG. 20, the head bearing block 210 holds the head bearing 222 to rotatably support the rotor 26 on the head 24. The rotor 26 (FIG. 21) is positioned about the rotor spindle 230 which extends through the rotor 26.

Figure 21:
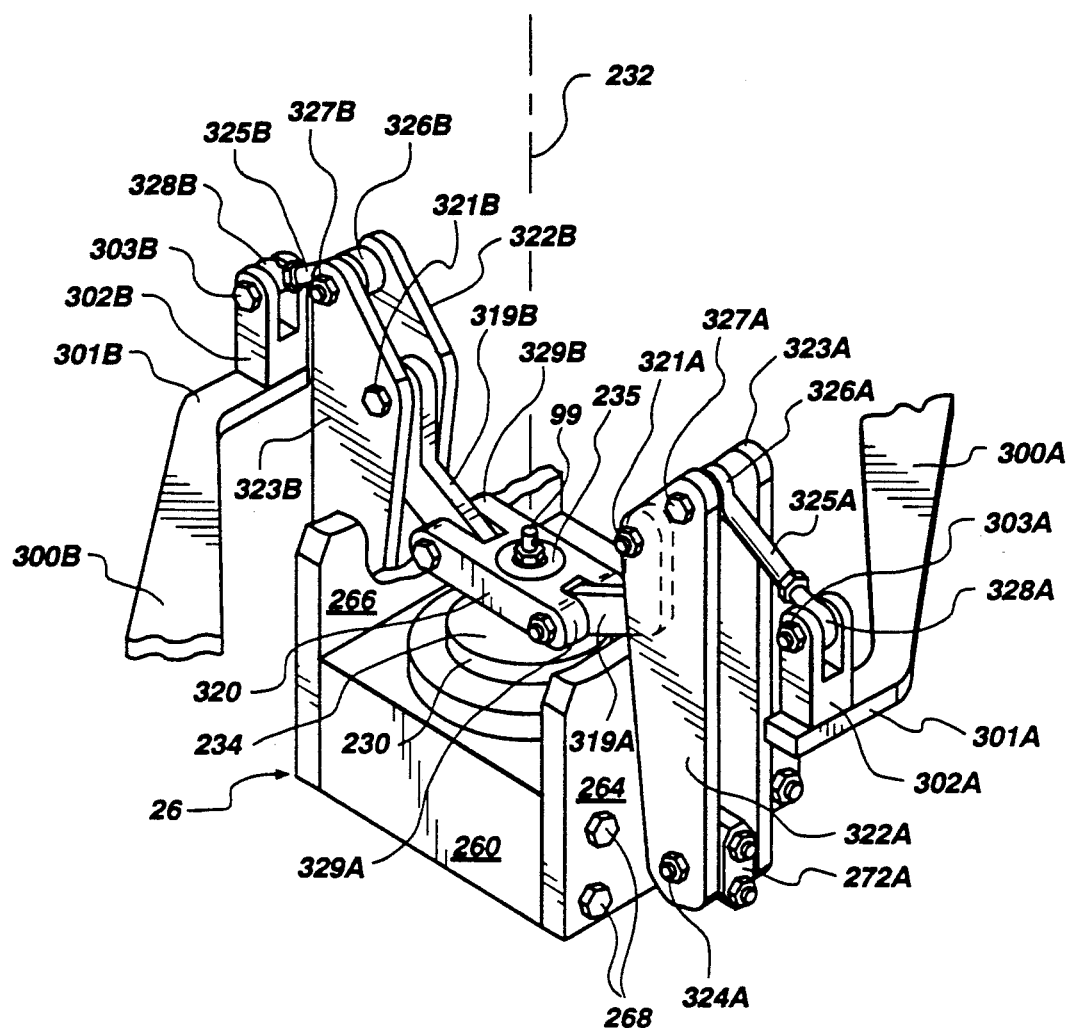
FIG. 21 is a cutaway perspective view of the collective pitch control linkage for changing the blade pitch of the invention.

In FIGS. 18 and 21, the rotor spindle 230 serves to connect the rotor 26 to the head 24 and to provide a rotatable connection between them. The head 24 and rotor 26 are retained together by means of a spindle head 234 and a spindle nut 236. The spindle head 234 is formed at the distal end of the spindle 230 to create a shoulder to retain the rotor 26 on the rotor spindle 230. The spindle nut 236 is threadedly attached to the rotor spindle 230 to retain the rotor spindle 230 on the head 24. A first spindle spacer 238 is fitted against the lower face 237 of the head bearing 222 above the spindle nut 236 to minimize wear and stress concentrations on the spindle nut 236.

As seen in FIGS. 19 and 20, the rotor brake 240 is positioned above and attached to the head 24. The rotor brake 240 has a baseplate 242 mounted to the head bearing block 210 by removable attachment means such as a plurality of circumferentially disposed bolts (not shown). An expansion plate 244 is connected to the baseplate 242 by means of a multiplicity of alignment pins 246 which allow the expansion plate 244 to move toward and away from the baseplate 242 in alignment with the rotor axis 232 but to not allow rotation of the expansion plate 244 with respect to baseplate 242.

Attached to the upper face 245 of expansion plate 244 is a brake shoe 248 to provide a durable surface with a high coefficient of friction. In the art, a brake shoe may be attached by a variety of means including, for example, rivets 247.

Above the rotor brake 240 is the rotor disc 250 fixedly attached to the rotor bearing block 260 and forming the lowest element of the rotor 26. The friction plate 252 of the rotor brake 240 maybe is fixedly attached to the rotor disc 250 by an appropriate means such as bolts (not shown). In the preferred alternative, rotor disc 250 can be hardened and serve the function of a friction plate, eliminating friction plate 252. The brake baseplate 242 contains a brake seal groove 254 machined into its upper face 243 and contains within said brake seal groove 254 a brake "O"-ring seal 256. A channel 239 is formed in the baseplate 242 to extend from the lower face 241 to the upper face 243. The channel is sized at the upper face 243 to sealingly receive the brake seal groove 254. The channel 239 extends through face 241 to constitute a brake oil port 258 through which hydraulic oil can be introduced. Delivery of hydraulic oil to the brake oil port 258 can be done by a variety of manual, electrical, or pneumatic actuation schemes, all commonly known in the art. Likewise, fittings and plumbing for such a system are common in the art. When oil is delivered through the brake oil port 258 to the brake seal groove 254, pressure develops behind the brake "O"-ring seal 256 urging the expansion plate 244 toward and into contact with friction plate 252. The rotor brake 240 is assembled with a small brake clearance 259. The rotor brake assembly 240 does not contact the rotor spindle 230, having instead an aperture of sufficient diameter through the center of each appropriate element to provide adequate clearance between each element and the rotor spindle 230.

The rotor disc 250 (FIG. 20) is fixedly attached by bolts (not shown) to the rotor bearing block 260. The rotor bearing block 260 has means to retain the rotor bearing 262. Alternatively, a collar-type seal retains an upper bearing, while the rotor disk 250 retains a lower bearing in rotor bearing block 250. The rotor bearing block 260 also has the right rotor cheek plate 264 and the left rotor cheek plate 266 secured thereto with a multiplicity of rotor cheek plate bolts 268 to retain and space the rotor check plates 264 and 266.

A rotor ring gear 270 (FIGS. 17-19) is fixedly attached around the circumference of the rotor disc 250 to engage the spur gear 228 of the bendix 223. By this means, the rotor can be "pre-rotated" prior to takeoff as hereinbefore described. The rotor bearing block 260 with its retained rotor bearing 262 and attached right rotor cheek plate 264 with left rotor cheek plate 266 on the rotor disc 250 and its associated rotor ring gear 260 constitute the rotor 26.

Figure 22:
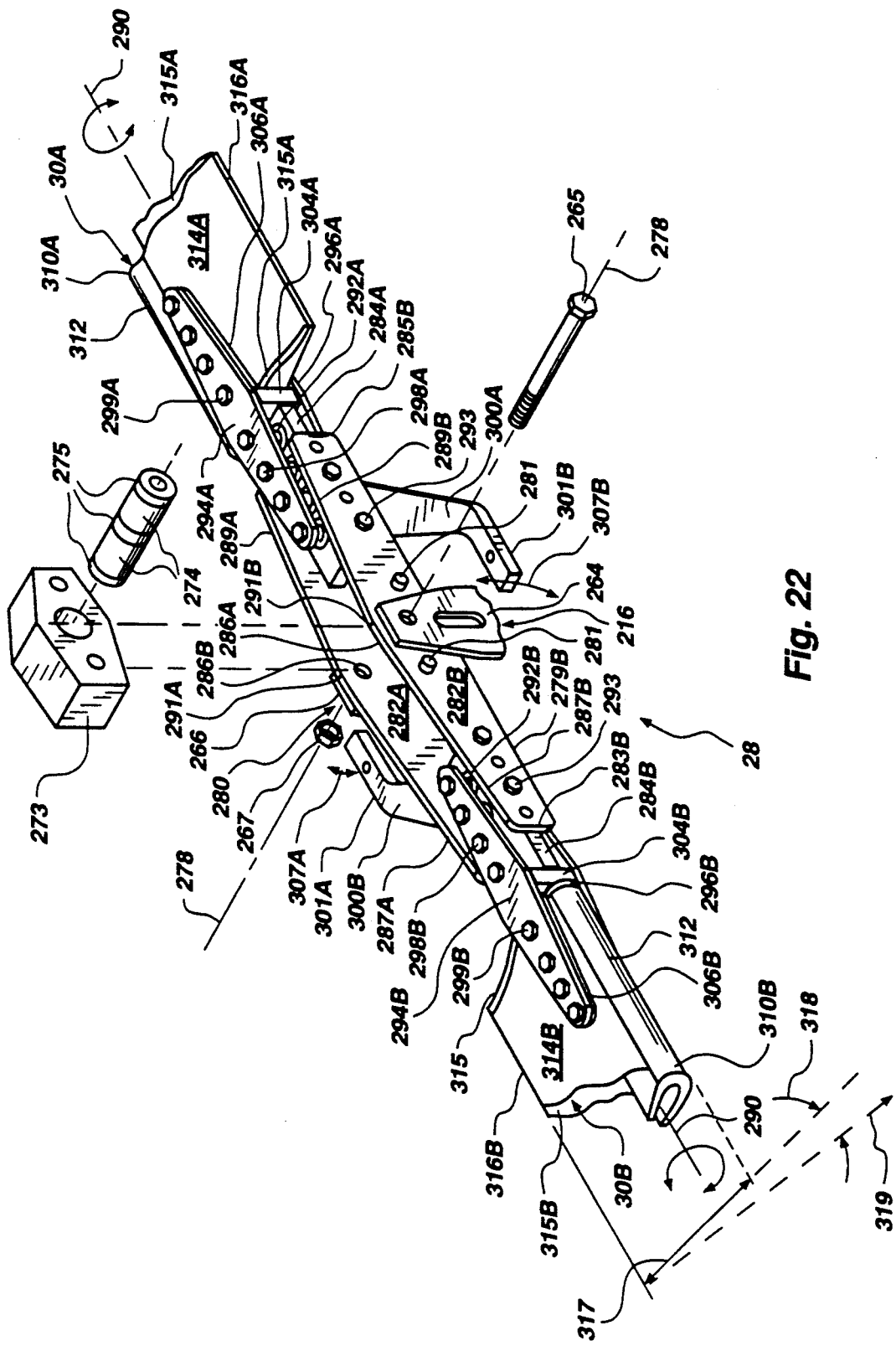
FIG. 22 is a partial perspective view of the teeter box portion of the invention.

In FIGS. 21 and 22, the rotor 26 and the rotary wing assembly 28 are symmetrical. That is, for every element on the right hand or on one half of the assembly, there is an identical matching item on the other side. Therefore, hereafter we will often discuss components only on one side of the rotor 26 and on one half of the rotary wing assembly 28. The reader should recognize that each component has a corresponding component on the opposite side.

Between the upper ends of the rotor cheek plates 264 and 266 fits teeter axle 265 which penetrates through teeter axle journals 274. The teeter axle 265 is retained by appropriate means such as a threaded nut 267. The center line of the teeter axle 265 is the teeter axis 278 about which the rotary wing assembly 28 teeters, subject to the restraint of teeter stops 281 contacting cheek plates 264 and 266 at the extremes of permissible motion. The rotary wing assembly 28 is supported in this teeter motion by means of a teeter box 280, which can teeter on teeter axis 278. A teeter block 273 is fixedly attached inside the teeter box 280 to receive the teeter axle journals 274. To minimize friction and wear, the teeter block 273, shown removed from the teeter box 280 and exploded for detail in FIG. 22, is preferably fitted with needle bearings inside teeter journals 274, which are set apart by spacers 275.

The teeter box 280 has teeter box cheek plates 282A, 282B spaced apart by blade bearing blocks 284A, 284B. The teeter box cheek plates 282A, 282B are pentagonal and shaped similarly to a low and elongated gable, but may be shaped to remove metal for clearances such as on their bottom edges. That is, the bottom edges 279A, 279B of the cheek plates are straight and terminate at both ends with vertical edges 283A, 283B and 285A, 285B. The upper two edges 287A, 287B and 289A, 289B meet at each respective teeter box cheek plate vertex 291A, 291B to form a slight peak. The teeter box cheek plates 282A, 282B have the apertures 286A, 286B to receive the teeter axle 265 and in turn may rotate or teeter thereabout through a limited angle amounting to a teetering or oscillation.

The blades 30A and 30B are attached to the teeter box 280 as best seen in FIG. 22. A left blade bearing block 284A and a right blade bearing block 284B are each positioned between the teeter box cheek plates 282A and 282B. The blade bearing blocks 284A and 284B are retained by a multiplicity of bolts 293 through the teeter box cheek plates 282A, 282B into the blade bearing blocks 284. The blade bearing blocks 284A and 284B are positioned on the center line or blade pitch axis 290. A multiplicity of spherical bearings 292A, 292B are distributed along the length of the blade bearing blocks 284A and 284B to be in or along the blade pitch axis 290.

The blade bearings 292A and 292B are retained by suitable retention arrangement known in the art to remain secure within the blade bearing blocks 284A and 284B. In the illustrated embodiment, four such spherical bearings 292A, 292B are retained within each blade bearing block 284A and 284B. Attached to blade bearings 292A and 292B are upper straps 294A and 294B and lower straps 296A and 296B, identical and each in the shape of an elongated diamond as illustrated. The upper straps 294A and 294B and lower straps 296A and 296B are secured by bolts 298A and 298B through the upper strap 294A and 294B and lower strap 296A and 296B and passing through the blade bearings 292A and 292B. Similarly, the bolts 299A and 299B hold rotor blades 30A and 30B respectively, are of descending size toward the outer tips of rotor blades 30A and 30B and are secured with nuts (not shown).

Figure 23:
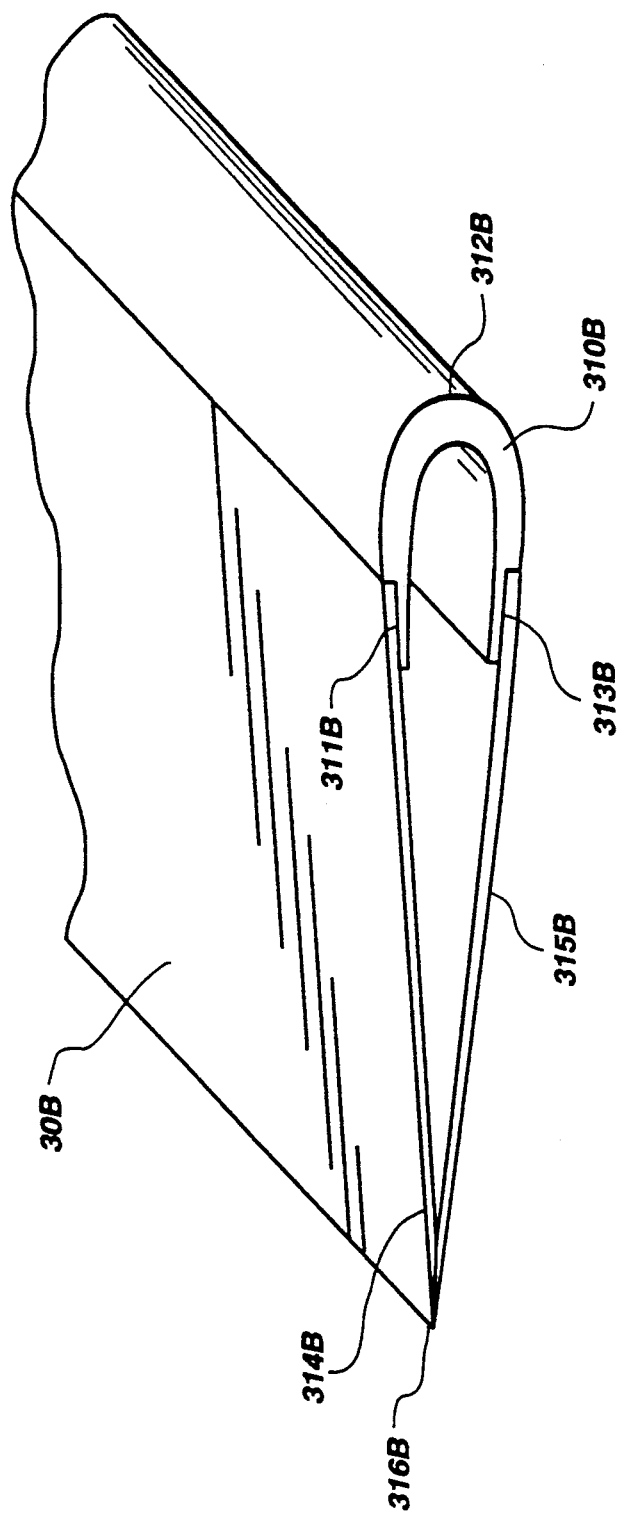
FIG. 23 shows the assembly of the skin and leading edge of the rotating blade which forms the rotary wing of the invention.

Referring to FIGS. 21, 22 and 23, the pitch change horns 300A and 300B are shown secured to the teeter box 280 by the bolts 298A and 298B. That is, the bolts 298A and 298B are sized so the pitch change horns 300A and 300B can be bolted to the outside surfaces of the lower straps 296A and 296B. On the top surface of the distal ends 301A and 301B of the pitch change horns 300A and 300B are fastened pitch change horn yokes 302A and 302B machined to receive rod end bearings 326A and 326B and retain them by means of bolts 303A and 303B running parallel to the distal ends of the pitch change horns 300A and 300B (FIG. 21). The upper straps 294A and 294B and lower straps 296A and 296B extend outwardly from the blade bearings 292A and 292B where they are spaced apart by strap blocks 304A and 304B rigidly fastened between them, preferably by bolts. Immediately outward from the strap blocks 304A and 304B, the upper straps 294A and 294B and lower straps 296A and 296B sandwich the rotor blades 30A and 30B between them but with upper strap spacers 306A and 306B between the upper straps 294A and 294B and the rotor blades 30A and 30B. The spacers 306A and 306B are preferably shaped to provide a snug fit in view of the camber or shape of the blades 30A and 30B, and clearances for motion thereof. A lower spacer (not shown) is located between the lower straps 296A and 296B and the rotor blades 30A and 30B to similarly provide for appropriate spacing and fit.

In FIGS. 22 and 23, each rotor blade 30A and 30B has a blade spar 310A and 310B, respectively, which extends along the length of the blade 30A and 30B to give it structural rigidity against transverse and longitudinal loads caused by gravity, lift, or centripetal forces and also to form the shape of the leading edge 312A and 312B of the blade 30A and 30B. On each blade spar 310A and 310B is fastened the upper skin 314A and 314B, and the lower skin 315A and 315B to form the rotor blades 30A and 30B. The upper skin 314A and 314B is riveted or otherwise bonded onto lower skin 315A and 315B at the trailing edge 316A and 316B. Recesses 311A and 311B and 313A and 313B allow the attachment of upper skin 314A and 314B and lower skin 315A and 315B to fit flush with the outer surface of blade spars 310A and 310B. Also, the blade spars 310A and 310B are preferably twisted along their length, and the upper skin 314A and 314B with lower skin 315A and 315B, being separate prior to fabrication, facilitate such a twist, thus allowing the angle of incidence or angle of attack of the blades 30A and 30B to vary from the proximal to distal ends. This twist allows one to design for optimal rotational speed in flight at the same time as for optimal lift characteristics by designing a unique variation from the nominal value of the angle of attack of the blades 30A and 30B, along the blades 30A and 30B.

The distance between the leading edges 312A and 312B and the trailing edges 316A and 316B is defined as the airfoil chord 317. By means of the blade bearings 292A and 292B rotating within the blade bearing block 284, the rotor blades 30A and 30B can be rotated to change their angle of attack 318 which is the angle between the chord 317 and the direction of travel 319 through the air of the blades 30A and 30B.

The pitch change horns 300A and 300B act as levers to rotate the rotor blades 30A and 30B about the blade pitch axis 290. The distal ends 301A, 301B of pitch change horns 300A and 300B rotate up and down along arc 307A, 307B to in turn cause the lower straps 296A and 296B to similarly rotate and in turn transmit rotation through bolts 298A and 298B in their blade bearings 292A and 292B to the blades 30A and 30B. The resulting movement of the blades 30A and 30B varies the angle of attack 318 and in turn the lift developed by the blades 30A and 30B.

The pitch change horns 300A and 300B are actuated, through link arms 319A and 319B, by the crossbeam 320. Link arms 319A and 319B are secured by bolts 321A and 321B to drive pairs of spaced plates 322A and 322B and 323A and 323B which are hingedly mounted by bolts 324A and 324B (not shown) to cheek plates 264 and 266 by mounting tongues 272A and 272B (not shown) bolted to the cheek plates 264 and 266. The spaced plates 322A and 322B and 323A and 323B drive legs 325A and 325B, respectively. The legs 325A and 325B each have a rod end bearings 326A and 326B rotatably mounted by bolts 327A and 327B to the plates 322A and 322B and 323A and 323B. The legs 325A and 325B are mounted by rod end bearings 328A and 328B at their other ends to the pitch change horn yokes 302A and 302B. The link arms 319A and 319B are rotatably connected between fingers 329A and 329B of the crossbeam 320 as shown.

In FIGS. 21 and 22, but also referring to FIGS. 2, 9-2, 19-23, the operation of the crossbeam 320 and the angle of attack 318 or collective pitch change of the rotor blades 30A and 30B is best understood by starting in the cockpit 70 on the left floor 138A adjacent the pilot's seat 72. The collective pitch system 90 includes a collective arm 92 having a proximal end containing a collective handle 93 for grasping and operation by the pilot. The distal end is rotatably secured at a collective mount 91, (FIG. 9) which may be fabricated as a left collective mount 91A (FIG. 10) and a right collective mount 91B, (FIG. 11) by which the collective lever 92 is movably attached to the frame 12 so as to pivot. The collective lever 92 is suitably attached to the collective push-pull cable 94 so as to move the collective push-pull cable 94 with respect to and within the collective casing 96.

In FIGS. 9-13, the collective casing 96, by its end nearest the collective lever 92, is connected by an appropriate cable casing bracket 95 to the frame 12, while the collective cable 94 terminates, by suitable means such as a rod end bearing, in a connection to rocker extension 330 protruding from, and fixedly attached to or integrally formed on, collective rocker 331. Collective lever 92 is likewise attached fixedly to the collective rocker 331 to allow communication of the hollow center of collective lever 92 to communicate through an opening in the collective rocker 331. Collective rocker 331 is rotatably mounted between left collective mount 332A and right collective mount 332B so as to rotate about rocker axis 333. The top of the collective rocker 331 may rotate backward until collective lever 92 strikes rocker stop 334 which is fixedly mounted between left collective mount 332A and right collective mount 332B. The top of the collective rocker 331 may rotate forward until the collective rocker 331 is restrained by the rocker stop 334. Thus the collective push-pull cable 94 can be pushed or pulled relative to the collective casing 96 by the rocker extension 330 as the collective lever 92 is pivoted by the pilot about rocker axis 333.

Figure 10:
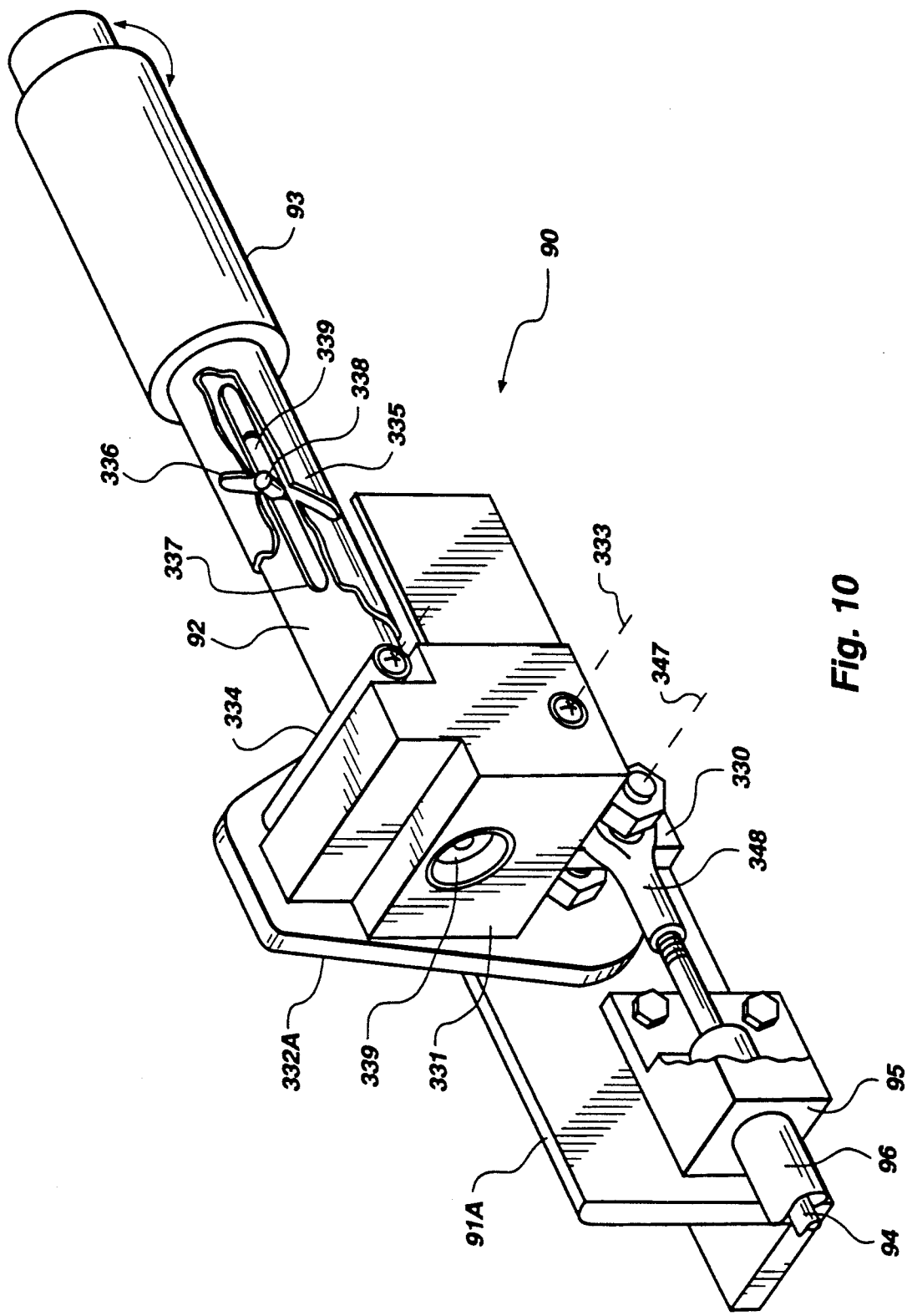
FIG. 10 shows a cutaway perspective view of the collective pitch lever with its associated mounting bracket and connections.
Figure 11:
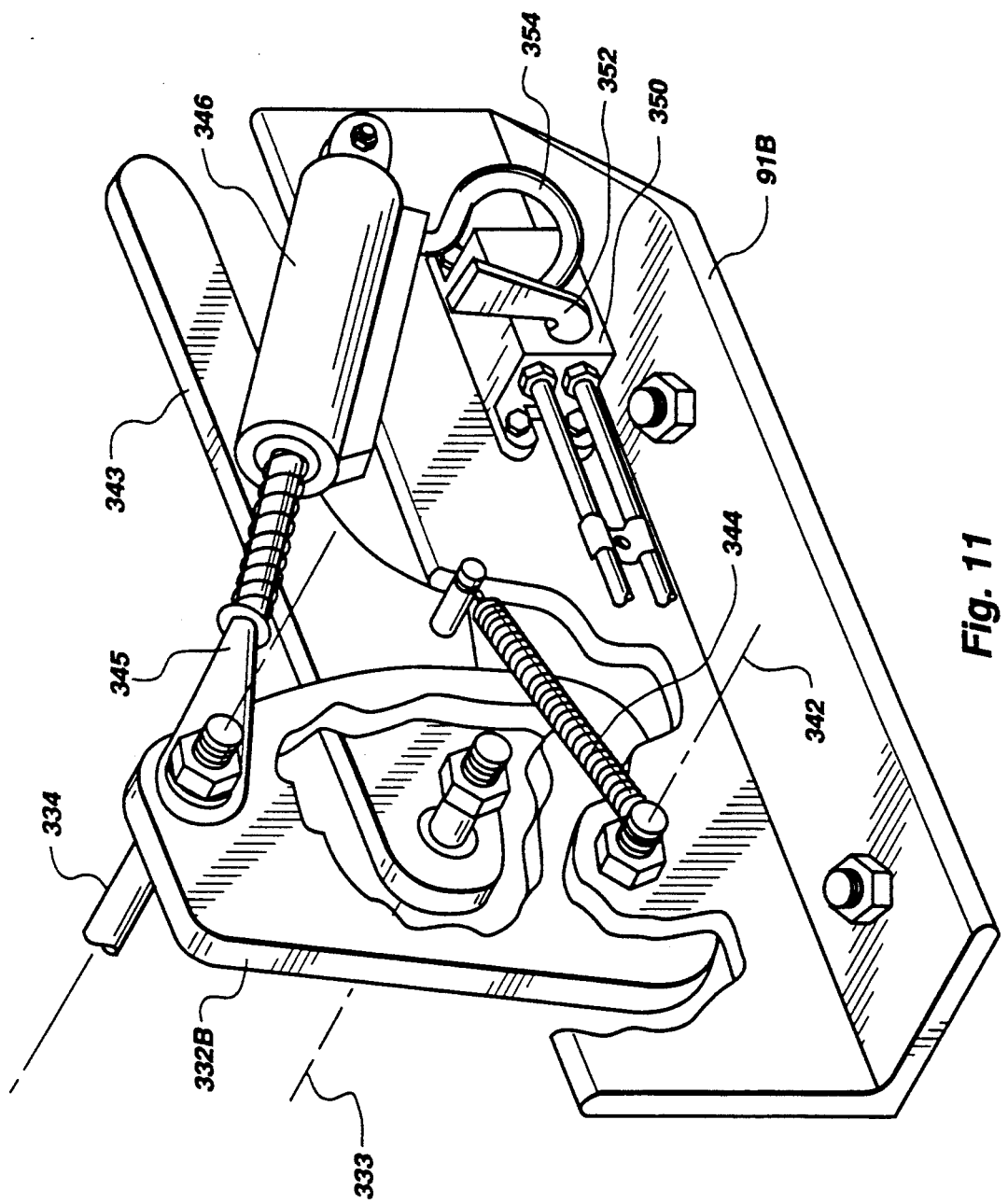
FIG. 11 shows a cutaway perspective view of the mounting bracket for the collective pitch lever with the prerotator control lever, mode valve and actuating cylinder.
Figure 12:
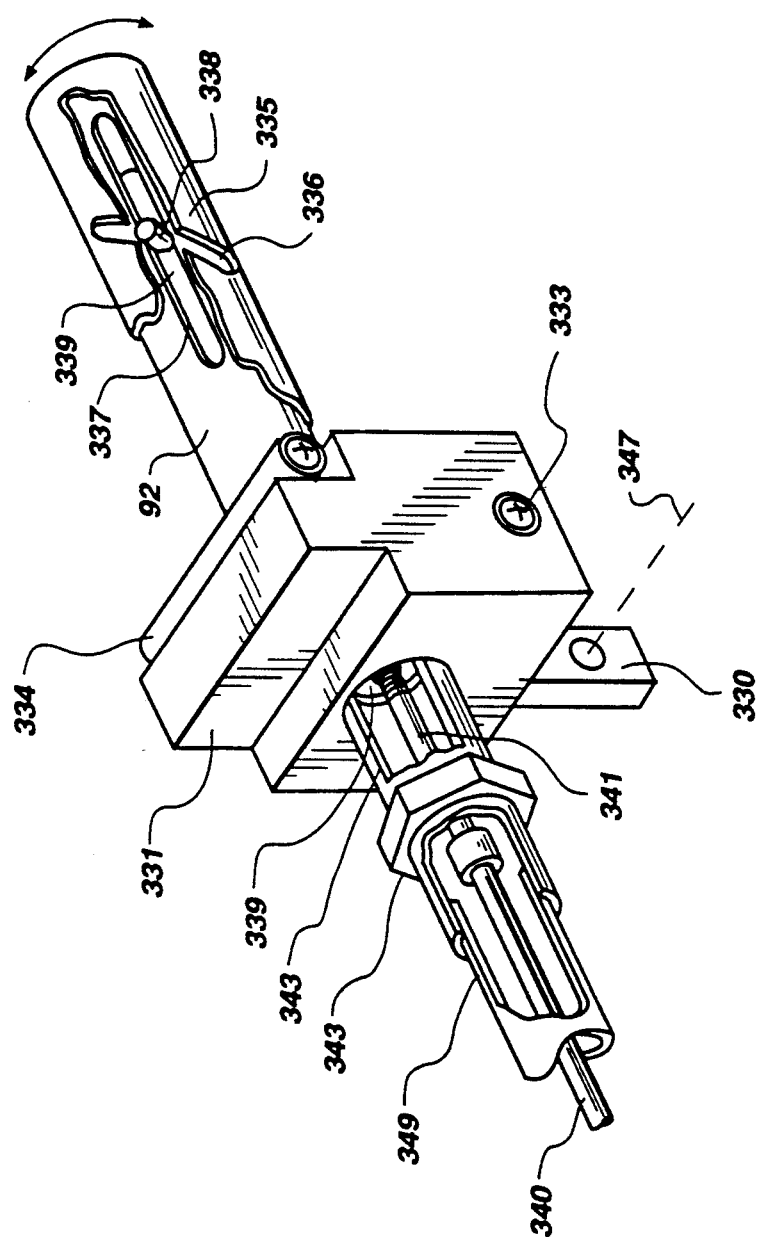
FIG. 12 shows a cutaway perspective view of the throttle control mounted in the collective pitch control lever.

Referring particularly to FIGS. 10, 11 and 12, the collective lever 92 is fitted with a throttle sleeve 335 on which the collective handle 93 is fixedly mounted such that both rotate with respect to the collective lever 92. The throttle sleeve 335 has a diagonal slot 336 cut through it that coincides with a lengthwise slot 337 cut through the collective lever 92 to allow a throttle follower 338 to protrude through from the throttle slide 339, a moveable member to which the throttle follower 338 is fixedly attached. The throttle follower 338 thus remains always coincident with each of said slots 336, 337, thus causing the throttle slide 339 to slide in response to a rotation of the collective handle 93. The throttle slide 339 has fixedly attached to it, a throttle cable 340 attached by means of a throttle cable termination 341. A throttle cable casing 349 is fixedly attached to the collective rocker 331 by a throttle casing fitting 343 which is preferably threaded into the collective rocker 331 to maintain their relative positions. The throttle cable 340 is fitted appropriately to the engine 32 to actuate the fuel feed. Thus the pilot by a twist of the collective handle 93 sets the position of the throttle cable 340.

Figure 13:
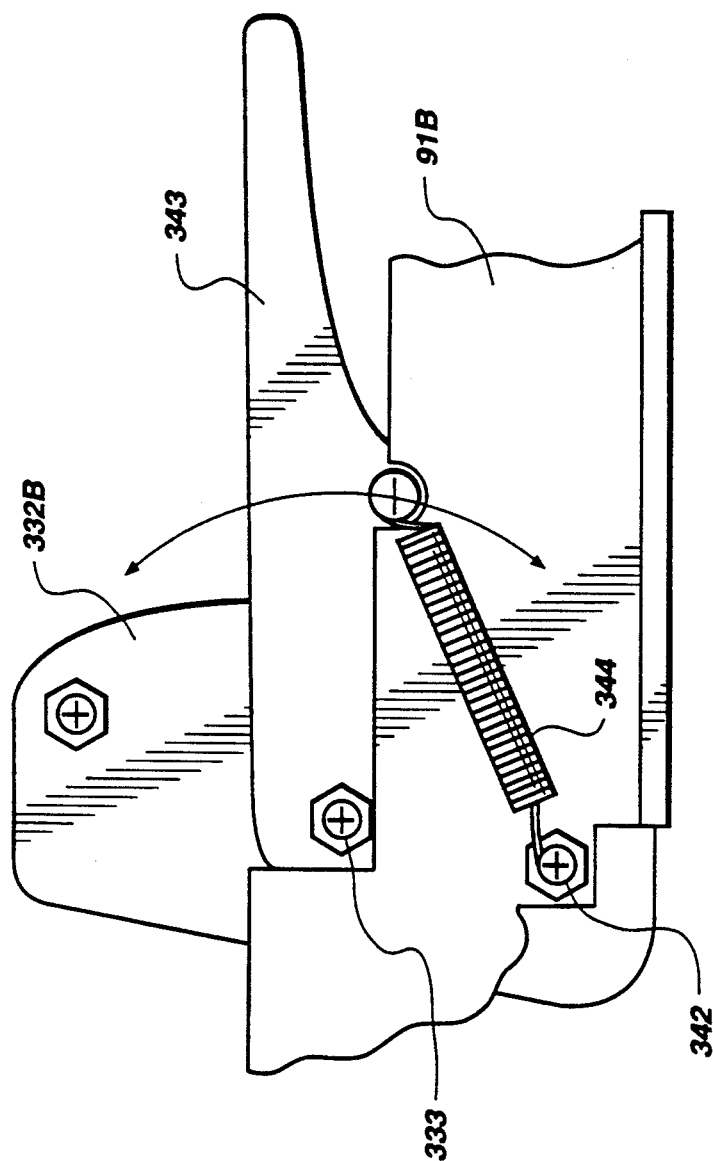
FIG. 13 shows an elevation view of the prerotator control lever attached to the mounting bracket for the collective pitch lever.

Referring to FIG. 13, with reference back also to FIGS. 10, 11, and 12, the collective rocker 331, when rotated forward until lodged against the rocker stop 334, can yet be moved about the prerotator and rotor brake lever axis 342 if the prerotator lever 343 is lifted against the prerotator and rotor brake lever spring 344, to release the left and right collective mounts 332A and 332B to rotate about the prerotator lever axis 342. In this situation, the collective rocker 331, the collective lever 92, and the left and right collective mounts 332A and 332B rotate monolithically about prerotator and rotor brake lever axis 342, to depress the cylinder ram 345 of the prerotator and rotor brake actuation cylinder 346 (FIG. 11).

In FIG. 11, valve 350 is set with lever 352 before takeoff to direct hydraulic oil to the prerotator system 100, activating it. Valve 350 is set by lever 352 before parking the autogyro aircraft to direct oil to the rotor brake 240. Thus the prerotator and rotor brake actuation cylinder 346 will send hydraulic oil to actuate the clutch assembly 102 or rotor brake 240 depending on the position of valve 350. (FIG. 14). When the collective rocker 331 is rotated forward as explained, it pivots about prerotator lever axis 342 which is collinear with the pivot centerline 347 of collective cable termination 348 of the collective push-pull cable 94 on rocker extension 330 (FIGS. 10, 12). Thus, the position of the collective push-pull cable 94 and the resulting collective pitch of the blades 30A and 30B is not affected by the depression of the collective lever 92 during prerotation or rotor brake application.

Returning to FIGS. 2, 9, 20, 21, and 22, the collective push-pull cable 94 inside the collective casing 96 is routed up the tower 20 to the vicinity of the head 24 where the collective casing 96 is terminated in a collective block 98 appropriately adapted to receive the collective casing 96 and fastened by a retaining means 98A. The collective push-pull cable 94 extends beyond the collective block 98 to a collective push-pull cable termination 94A which is threadedly and fixedly attached to the bottom side of the rotor bearing block 260.

The collective block 98 is sufficiently wide to hold a collective rod 99, which collective rod 99 extends upward from the collective block 98 through the center of the rotor spindle 230 through which is drilled the rotor spindle way 231. The collective rod 99 extends up and beyond the spindle head 234 to penetrate the crossbeam bearing 235. The collective rod 99 below the crossbeam bearing 235 and a nut above the crossbeam bearing 235 fasten the collective rod 99. Thus, the collective rod 99 can be pushed up or pulled down and keeps the crossbeam 320 with it in either direction of motion.

In FIG. 9, the actuation of the crossbeam 320 occurs when the pilot pulls the collective arm 92, pulling the collective push-pull cable 94 relative to the collective casing 96. At some flexible turn 97 of the collective casing 96, the relative motion of the collective push-pull cable 94 with respect to the collective casing 96 will cause the radius of the flexible turn 97 to be reduced since the collective push-pull cable termination 94A is fixedly connected to the rotor bearing block 260 so that it cannot move relative thereto.

Thus, the slack taken up by the relative motion of the collective push-pull cable 94 with respect to the collective casing 96 is taken out of the circumference of the flexible turn 97, located anywhere along the path of the collective casing 96, causing the collective block 98 to move upwardly relative to the fixed collective push-pull cable termination 94A. As the collective block 98 moves upward through the rotor spindle way 231, it carries the collective rod 99 which, in turn, pushes the crossbeam 320 upward. As the crossbeam 320 rises away from the rotor spindle head 234, it carries the link arms 319A and 319B which are connected as hereinbefore discussed.

Figure 24:
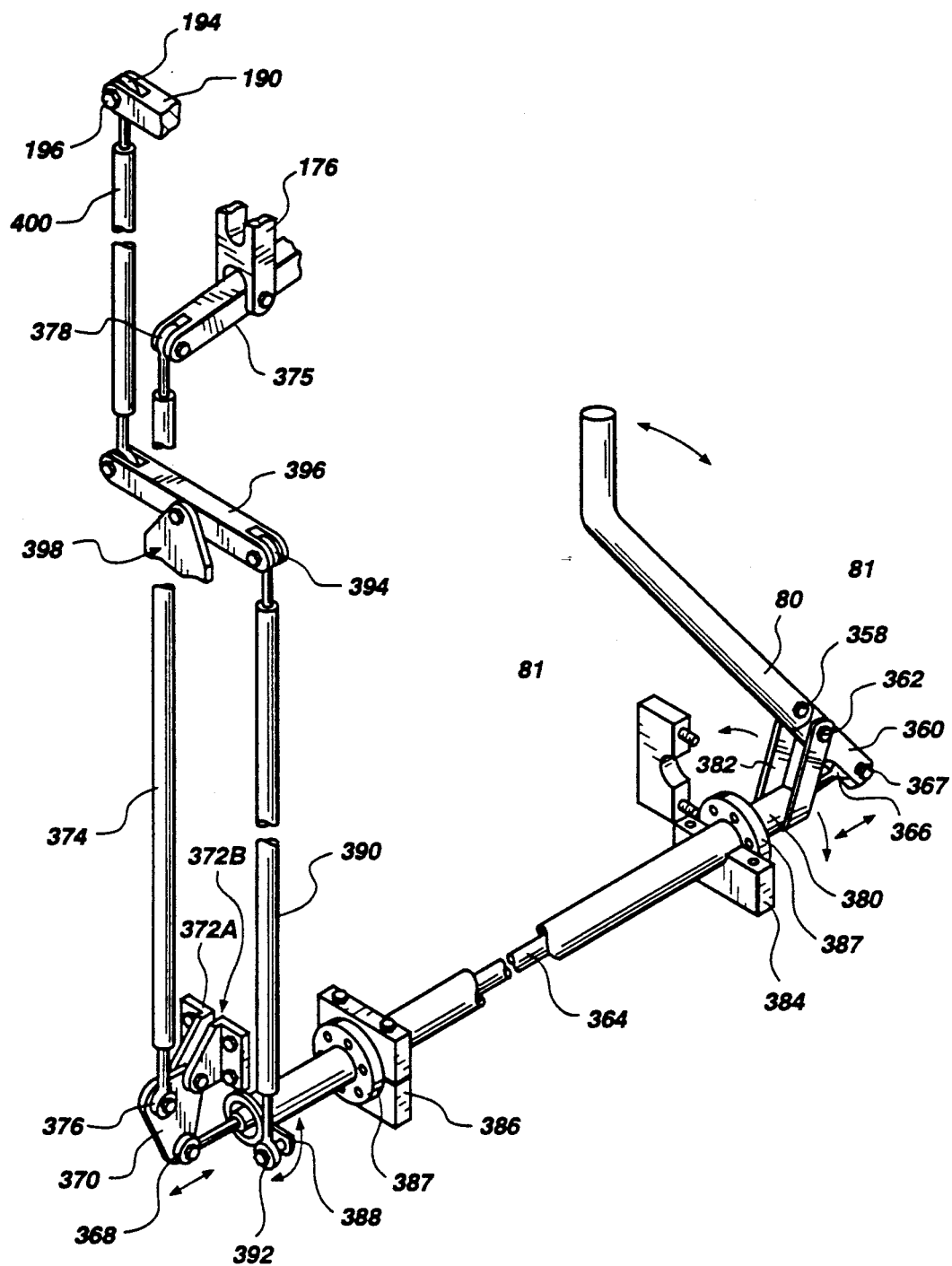
FIG. 24 is a perspective view of the control stick with its related linkages of the invention.

The control of roll and pitch of the aircraft 10 with respect to the rotor assembly 22 is best understood by reference to FIGS. 2, 18, 19, 20 and particularly 24. The stick 80 of FIG. 24 is in the cockpit 70 of FIG. 2. The stick 80 has a proximal end for grasping by the pilot and a distal end which is attached by a yoke bolt 358 (See FIG. 24) to a stick yoke 360, spaced from a stick pivot 362. The stick yoke 360 is fastened to the first head pitch link 364 by a bolt 367 and more specifically to the front rod end bearing 366 attached thereto.

In FIG. 24, the first head pitch link 364 runs rearwardly through the control tunnel 88 (See FIGS. 2 and 2C) to terminate with a rear rod end bearing 368 fastened, preferably by a bolt, to a first crank element 370. The first crank element 370 is, in turn, fastened by means of a first crank bracket 372A and 372B fixedly attached to the rear fire wall 124 (See FIG. 2) to allow a rocking motion by the first crank element 370. The aft end of the first crank element 370 is fastened to the second head pitch link 374 comprising a stick third rod end bearing 376 and a stick fourth rod end bearing 378. The stick third rod end bearing 376 is attached to the aft end of the first crank element 370, while the stick fourth rod end bearing 378 is attached to the lever arm 375. The lever arm 375 is connected to arm 377 to in turn move head pitch yoke 207.

In operation, the stick 80 is pulled rearward by the pilot causing it to pivot about the stick pivot 362 moving the stick yoke 360 forward. In turn, the stick yoke 360 draws the first head pitch link 364 forward and the attached first crank element 370 with it by the lower end of the first crank element 370. In response, the first crank element 370 is rotated to cause the upper end of the first crank element 370 to rotate downwardly, drawing the second head pitch link 374 down with it. Finally, the second head pitch link 374 draws the lever arm 375 down which in turn pushes the head pitch yoke 207 (See FIG. 17) upwardly to cause the entire head 24 to tilt rearwardly about the universal pitch axis 186.

In FIG. 24, the stick 80 is attached at the stick pivot 362 to the stick roll tube 380 by means of the roll tube yoke 382 extending upwardly and forwardly from the forward end of the stick roll tube 380. The stick roll tube 380 is fastened to the frame 12 by a tube front journal 384, shown opened before assembly in FIG. 24, and a tube rear journal 386. A pair of restraint rings 387 are fixed to the stick roll tube 380 to restrain the stick roll tube 380 from moving forward and backward in the tube front journal 384 and tube rear journal 386. The restraint rings 387 allow the stick roll tube 380 to rotate freely. The aft end of the stick roll tube 380 terminates with a fixed attachment to a roll tube crank 388, preferably by welding. The roll tube crank 388, in turn, is attached, preferably by a bolt or similar fastening means, to the first head roll link 390 by means of a lower rod end bearing 392 affixed thereto. The first head roll link 390 is likewise terminated at its upper end by an upper rod end bearing 394 which is received by a roll rocker arm 396 secured thereto by a fastening means such as a bolt. The roll rocker arm 396 pivots with respect to the roll rocker arm bracket 398 to which it is secured by a bolt through its center. The opposite end of the roll rocker arm 396 receives the second head roll link 400 which extends upwardly. Thus, movement of the stick 80 from side to side produces a side to side rocking movement in the head 24 of the rotor assembly 22 to induce or control roll about roll axis 174.

It may be noted that the leverage of arm 375 and arm 396 can be varied to effect a mechanical advantage or disadvantage as desired for a particular aircraft.

In the prior art, autogyro rotor blades were articulated with three degrees of freedom relative to the rotor head in order that the rotating blades might find their own equilibrium position for their axis of rotation. The need was partially due to the effect of advancing blades having maximum lift and retreating blades having minimum lift. That is, the axis of rotation was not coincident with the axis of lift, also called the lift line.

Referring to FIGS. 22 and 23, in the present invention the blades 30A and 30B are not separately articulated, rather the entire rotary wing assembly 28 is suspended by the teeter axle 265 so that it can oscillate up and down on the teeter axis 278. This necessarily means that when the advancing blade 30A or 30B seeks to climb, the retreating blade 30B or 30A must be depressed relative thereto. However, such motion is the natural state of affairs of the blades 30A and 30B. Similarly, whereas one advancing blade 30A or 30B may tend to lead an imaginary diametral line through the rotor 26, the retreating blade 30B or 30A, by contrast, tends to lag the same diametral line.

The instant invention has a rotary wing assembly 28 which is rigid with respect to relative circumferential motion between the blades 30A and 30B. Thus, any tendency of an advancing blade 30A or 30B to lead must overcome the opposing tendency of a retreating blade 30B or 30A to lag. In the instant invention, this creates no difficulty, the strength of the blades 30A and 30B being sufficient to sustain any imposed load.

The flapping motion, the tendency of a blade to fly up or down depending on whether it is advancing or retreating relative to the airstream, is thus solved by using teeter axle 265, whereas the lead/lag propensity of the blades 30A and 30B is overcome by the rigidity and structural strength of the blades 30A and 30B. The third degree of freedom is the angle of attack 318 or blade pitch conceptually thought of as the rotation of the rotor blades 30A and 30B about the blade pitch axis 290. In the prior art, this degree of freedom was limited to an adjustment after manufacturing and was not adjustable in flight, especially for a semi-rigid rotor. Here, by contrast, this important degree of freedom of the blades 30A and 30B is fully adjustable in flight, at will, by the pilot.

Referring back to FIGS. 2 and 2D, the extensions 36A, 36B have extension ribs 402A, 402B arranged along left and right leading edge spars 119A and 119B and left and right trailing edge spars 117A and 117B all covered with an extension skin 406 to create a structure secured to attachment rails 408A and 408B. The extension 36A, 36B may be formed as a fixed wing and is positioned symmetrically with respect to the center of the autogyro 10. Therefore, only one side of components need be discussed, the other half of the extension having identical mirror-image components.

The extensions 36A, 36B may provide aerodynamic lift to the extent that it is shaped into an airfoil to give lift according to the forward airspeed of the autogyro 10. The extensions 36A, 36B also provide structural support and mounting for the main landing gear 40 and the tail assembly 38. The extensions 36A, 36B are fixedly attached by appropriate attachment means such as bolts, rivets, or other fastening means known in the art, to the right vertical rail 126B and the left vertical rail 126A which are in turn fixedly mounted to the rear fire wall 124 and to the left and right tunnel beams 118A, 118B of the monocoque module 114 of the frame 12. The main landing gear 40 is attached near the distal end of the extension 36A, 36B and is covered when retracted by the extension cap 410 (FIG. 1) which is a composite fabrication serving as an airfoil, faring, and enclosure for the ends of extension 36A, 36B.

As earlier noted with respect to FIGS. 1 and 2, a right boom 44B and a left boom 44A are attached to the extensions 36A, 36B by any means desired to provide the requisite support. In the illustrated embodiment, a slot is formed in the trailing edge of the extensions 36A, 36B. The left and right booms 44A and 44B extend into the extension 36A, 36B and are secured to the leading edge spars 404A and 404B and the trailing edge spars 119A and 119B Each boom 44A and 44B is covered by a boom faring 418 (FIG. 1) to minimize aerodynamic drag and to enclose right and left push-pull cable casings 64, 68.

In FIGS. 5 and 6, the pedal system 60 is illustrated. The left pedal 61A and right pedal 61B are connected to operate the control surfaces, ruddervators 56 and 58 (See FIGS. 1 and 2), via a combination of push-pull cables and appropriately mounted bell cranks and levers, the control surfaces, ruddervators 56 and 58. As shown, the right pedal push-pull cable 62 is fastened by appropriate means, such as a rod end bearing in the preferred embodiment, to the right pedal assembly 450 at the right pedal lever 451B. Similarly, the left pedal push-pull cable 66 terminates in the cockpit 70 by connection to the left pedal assembly 454 at its left pedal lever 451A. The right pedal assembly 450 includes the right pedal lever 451B fixedly attached by welding or other secure means to the right pedal outboard sleeve 462. The right pedal outboard sleeve 462 is tubular and extends outwardly. The right pedal arm 452 is fixedly attached by welding or other secure means to the right pedal outboard sleeve 462.

In FIG. 6, the right pedal outboard sleeve 462 is fixedly attached, preferably by a removable means such as a bolt, to the right inner sleeve 464. The right inner sleeve 464 is horizontally disposed adjacent the left pedal inboard sleeve 466 with a spacer 478 thereinbetween. The right pedal inboard arm 468 is attached to the right inner sleeve 464.

The lower end of the right pedal inboard arm 468 is drilled to receive an attachment means such as bolt 467. Notably, the sleeves 462 and 464 are fixed together snugly but are rotatably positioned on left inner sleeve 476 which is fixedly attached in center sleeve 469. Center sleeve 469 is rotatably mounted to frame 12 by passing through the left and right tunnel plates 130A, 130B.

In order to adjust for varying loads and operating conditions, it is frequently desirable to trim an aircraft to minimize the need to manipulate the controls by equilibrating the forces required to maintain a desired flight attitude. In the illustrated embodiment the ruddervators 56, 58 may be trimmed as discussed hereinafter. The structure shown in FIGS. 5, 6, 7A and 7B includes the right pedal inboard arm 468 which is connected to the trim crank 470 by a right drag link 472 pivotally attached to the bottom end of the right pedal inboard arm 468 by a bolt 467B. The entire right pedal assembly 450 is supported by the right tunnel plate 130B (FIG. 2, 2C, 5 and 6) into which the center sleeve 469 is journaled by right pedal crank journal 474 (FIG. 6). The right inner sleeve 464 is inserted outwardly through the pedal crank journal 474 and retained there by fastening right pedal outboard sleeve 462 over it. The right inner sleeve 464 is assembled to rock or rotate freely within the right pedal crank journal 474. Penetrating inside the left pedal inboard sleeve 466 is the left inner sleeve 476 about which the left pedal inboard sleeve 466 is also free to rotate.

In FIGS. 5 and 6, to the left, when viewed from the seat 72 (FIG. 2), is the left pedal inboard arm 480 fixedly attached to the left pedal inboard sleeve 466, preferably by means of a bolt, and approximately vertically oriented to terminate in a lower end drilled to receive a bolt for attachment to the left drag link 482 extending therefrom to the upper end of the trim crank 470 (FIG. 7B).

The center sleeve 469 extends leftward from the left pedal inboard arm 480 to extend through the left pedal crank journal 484 in the left tunnel plate 130A. The center sleeve 469 freely rotates in the left pedal crank journal 484 within the limits allowed by other components.

On the left side of the left pedal crank journal 484 is attached the left pedal outboard sleeve 486 fitted around the outside circumference of the center sleeve 469 and fixedly attached thereto, preferably by means of a bolt. The left pedal arm 456 is fixedly attached, preferably by welding, to the left pedal outboard sleeve 486 being disposed approximately parallel to the front wall 122 and attached to the left push-pull cable 66 in a fashion similar to that of the right pedal arm 452.

Tiltably attached to the right pedal 61B in FIG. 5 is the right brake lever 488B journaled to oscillate about the right pedal 61B for actuating a brake hydraulic cylinder 490 flexibly attached by its cylinder shaft 492 to the right brake arm 491B. The brake hydraulic cylinder 490 is attached to the brake crank 494B so that a forwardly rocking motion of the brake lever 488B about the brake center line 458B of the right pedal 61B will draw the brake crank 494B upward, compressing the cylinder shaft 492 into the brake hydraulic cylinder 490 increasing hydraulic pressure which is then carried by conduit means known within the art to the brake of the right main landing gear 40B. A similar arrangement exists at the left pedal 61A.

Figure 2E:
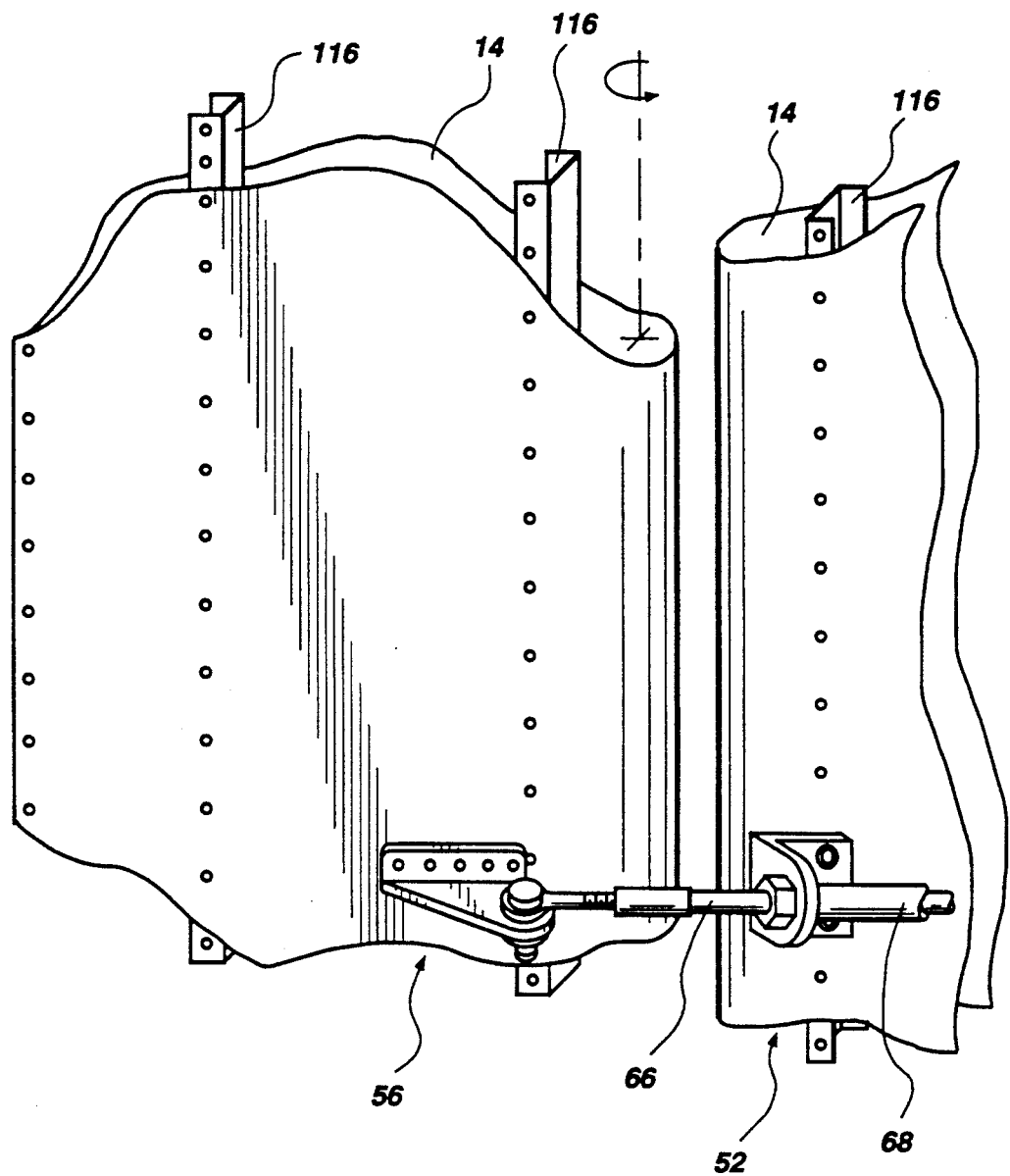
FIG. 2E is a detailed perspective cut-away view of the structure of the left ruddervator and control cable assembly of FIGS. 1 and 2.
Figure 8A:
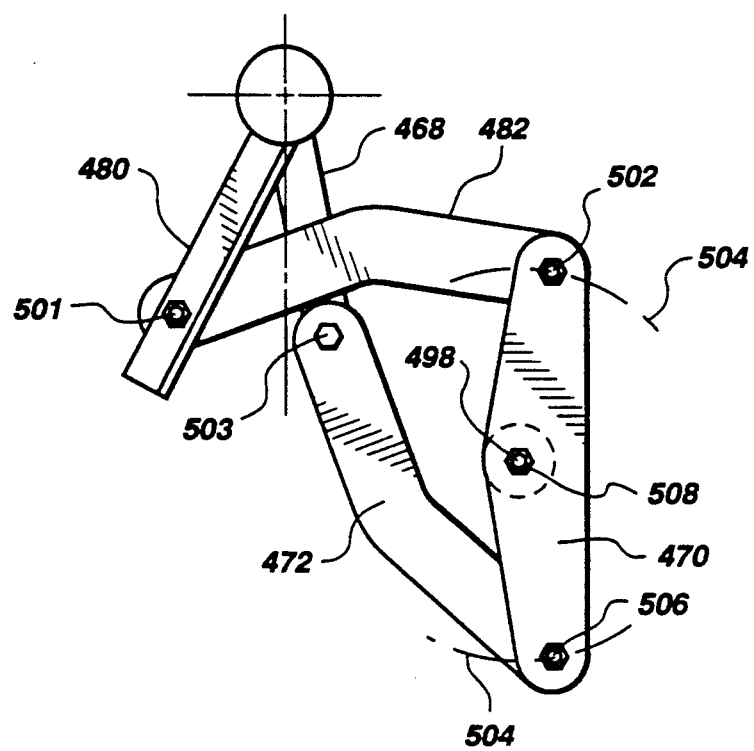
FIG. 8A is a side view of the drag link connection arrangement of the pedal control system of FIG. 5 with the left pedal depressed forward.
Figure 8B:
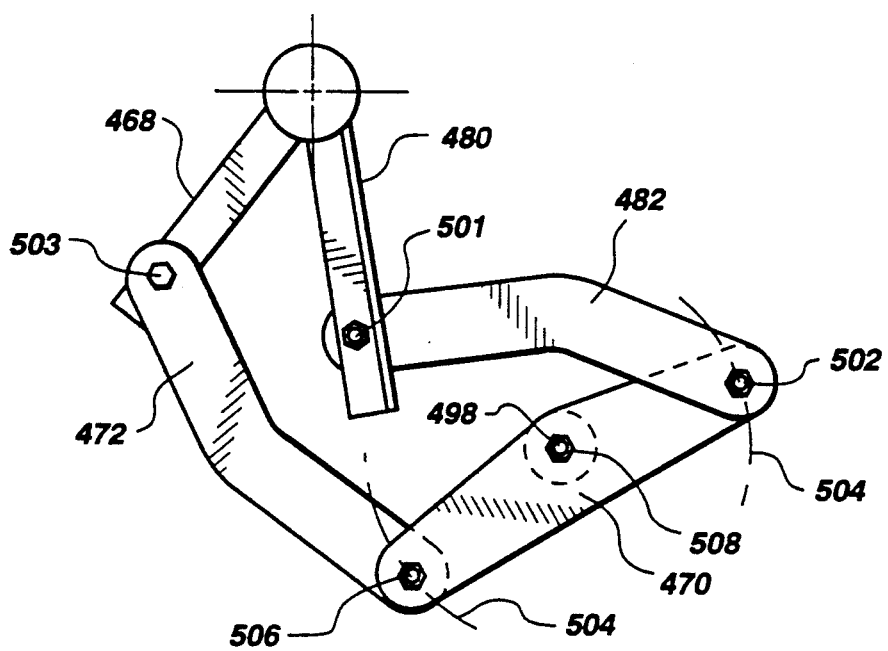
FIG. 8B is a side view of the drag link connection arrangement of the pedal control system of FIG. 5 with the right pedal depressed forward.

Referring to FIGS. 5 and 6, and the details of FIGS. 8A and 8B, the pedal control system 60 operates by actuation of the pilot pushing the right pedal 61B or the left pedal 61A forward in the cockpit 70. As the right pedal 61B is pushed forward, it rotates about the center of the center sleeve 469 and right inner sleeve 464 which are coaxial. As the right pedal 61B moves forward, it draws the right pedal inboard arm 468 downward, forcing the right pedal push-pull cable 62 into the right push-pull cable casing 64 causing the right pedal push-pull cable 62 to extend rearwardly at the ruddervator 58. The right ruddervator 58 thereby moves outwardly upon its hinged attachment to the right stabilator 54. This relation is shown in FIG. 2E for the left ruddervator 56, stabilator 68, push-pull cable 66 and cable casing 68. Meanwhile, the right inner sleeve 464 rotates with the right pedal outboard sleeve 462 to which the right pedal 61B is attached to cause the right inner sleeve 464 to rotate with it carrying the right pedal inboard arm 468 forward. In turn, right drag link 472 is drawn forward and with it the lower end of the trim crank 470.

As the trim crank 470 (FIG. 5) is rotated forwardly at its bottom end by a push forward on right pedal 61B, its top end reciprocates rearwardly moving the left drag link 482 rearward with its attached left pedal inboard arm 480 as right drag link 472 is drawn forward. Since the entire left pedal assembly 454 is an assembly of rigidly attached components, it must rotate the left pedal arm 456 rearward drawing out the left pedal push-pull cable 66 from its left push-pull cable casing 68. The left push-pull cable 66 moves, thereby operating the left ruddervator 56. (See FIG. 2E) A push forward on the left pedal 61A brings a similar result throughout the system but reversed.

However, the configuration of the trim crank 470 is selected so that when a right pedal 61B or left pedal 61A is pushed forward, the opposing pedal reciprocates rearward by a distance less than the forward travel of the forwardly moving pedal. The distance in the illustrated embodiment is one-half the forward travel distance. (See FIGS. 8A, 8B)

Large movements of the ruddervators 56 and 58 may be required at slow speeds. Thus in FIG. 5, the pilot may depress or move left pedal 61A or right pedal 61B inwardly the maximum permitted distance (or throw). Since the pedals 61A and 61B reciprocate, the opposing pedal would be expected to move rearwardly the same distance forcing the pilot's leg and knee rearward and potentially limiting the full throw or distance or imposing some physical discomfort on the pilot. Thus, the relative rearward travel from the ventral location is proportioned so that forward movement of one pedal (from ventral) results in an adjustable rearward movement of the other pedal equal to a fraction of the forward movement.

To effect the difference, the relative motions of the left pedal inboard arm 480 and the right pedal inboard arm 468 obtain different translations of upper connection point 502 and lower connection point 506 respectively by their positions with respect to tangent circle 504. That is, the distance which upper connection point 502 moves with respect to pivot point 501 depends directly on the location of the tangent circle 504 and whether upper connection point 502 is on the upper or back portion of the tangent circle 504 with respect to pivot point 501. The motion of lower connection point 506 with respect to pivot point 503 is similar. Thus, the diameter of the tangent circle 504 and location of trim crank rotation axis 498 is critically determinative of those relative motions.

In FIGS. 5 and 7A, the trim crank 470 has a trim crank rocker axis 496 and a trim crank rotational axis 498. As the trim crank 470 rotates about the trim crank rotational axis 498, the trim crank 470 moves defining a plane of motion in which the ends of the trim crank 470 define the diameter of a circle which circle has a center point at the trim crank rotational axis 498. The trim crank rotational axis 498 is itself moved by rotating the crank eccentric 500 around the trim crank rocker axis 496 as shown in FIGS. 7A and 7B. By rotating the trim crank eccentric 500 around the trim crank rocker axis 496, trim crank 470 is moved closer to or farther from the right and left push-pull cable casings 64 and 68 anchored in front wall 122, thus changing the locations of the trim crank upper and lower connection points 502 and 506 and the center of tangent circle 504 all in the same direction.

As the trim crank lower connection point end 506 of the trim crank 470 moves rearward, the right drag link 472 and right pedal inboard arm 468 move to impose a rotation on the right inner sleeve 464 and in turn on right pedal 61B. The right pedal 61B therefore returns rearward only a fraction of the distance that the left pedal 61A moves forward. The fraction is selected by adjusting the sizes and locations of tangent circle 504, and trim crank 470.

With reference to comparing the opposite case where the right pedal 61B moves forward, it is seen that the forward motion of the trim crank lower connection point 506 is at a maximum, while the rearward motion of trim crank upper connection point 502 is at a minimum or some other fraction of proportionality causing the left pedal 61A, in this case, to return only some fraction of the distance that the right pedal 61B has been moved forward.

Referring to FIGS. 7A and 7B, the trim crank eccentric 500 is mounted to the right tunnel plate 130B (seen in FIGS. 2C, 5 and 27) to support the trim crank 470 while allowing the trim crank eccentric 500 to rotate with respect to the right tunnel plate 130B and at the same time allowing the trim crank 470 to rotate about trim crank rotational axis 498 with respect to the trim crank eccentric 500.

In the illustrated embodiment of FIG. 5, a mounting bolt 508 is inserted through trim crank eccentric 500 (FIG. 7B) concentric with trim crank rocker axis 496, offset so as not to be coaxial with the trim crank rotational axis 498. A trim lever 510 is pushed or pulled by the pilot, moving threaded trim link 512 attached at one end, preferably by a pin or bolt, to the trim lever 510 and similarly attached to the eccentric ear 514 at the other end.

Thus, when the trim lever 510 is pushed or pulled, the trim link 512 moves the eccentric ear 514, rotating the trim crank eccentric 500. In turn, trim crank eccentric 500 moves the trim crank rotational axis 498 in an arc around trim crank rocker axis 496. The trim crank rotational axis 498 is thus adjusted forward or backward drawing right and left push pull cables 62 and 66 with it, both in the same direction in response to the trim lever 510.

The effect of moving the trim lever 510 is to adjust both left and right ruddervators 56 and 58 in the same direction as if both pedals had been moved forward or backward at the same time. The effect on flight is to trim the pitch 51 of the aircraft.

The need for trim in the yaw 50 direction is eliminated by the inverted "V" shape of the tail assembly 38 described above. The inverted "V" counteracts forces in the yaw 50 direction created by the rotating slipstream.

The prerotator system 100 seen in FIGS. 14 and 16 is driven by a series of parallel belts 101 proceeding from the crankshaft of the engine 32 fitted with an engine pulley 520. An idler pulley 522 is driven by the belts 101. The idler pulley 522 is rotatably secured to the clutch spindle 526 and is formed to be a pressure plate 528 preferably of anodized aluminum, or perhaps is faced with hardened steel, which is capable of carrying torque and tolerating heat without distortion. Next to the pressure plate 528, but not fixed to it, is the clutch shoe 530 mounted by suitable means, such as rivets 531 to the expansion plate 532 of similar construction to the pressure plate 528. The expansion plate 532 is attached by guide pins 534 to the baseplate 536.

The baseplate 536 unlike the continually rotating idler pulley 522, is fixedly attached to the clutch spindle 526 such that they rotate together but only whenever the clutch is engaged. The baseplate 536 is furthermore provided a passage 538 drilled across its diameter and through the clutch spindle 526 as well. The clutch spindle 526 has an oil way 540 drilled through spindle foot 542 and proceeding lengthwise to the location of the baseplate 536 where oilway 540 intersects the diametral passage 538. Oil pressure is maintained around the clutch spindle 526 by "O"-rings 541 which prevent the escape of oil at the intersection of clutch spindle 526 and baseplate 536. A rotary hydraulic joint 545 is attached to the spindle foot 542 to allow delivery of hydraulic fluid even while the spindle foot 542 is rotating. Oil under pressure can be delivered by a number of means known in the art.

In FIG. 16, the baseplate 536 is further provided with a seal groove 546, is fitted with an expansion "O"-ring 548 and a multiplicity of oil ports 550 connecting the diametral passage 538 with the seal groove 546. The assembly comprising the baseplate 536 with the expansion plate 532 rotates together because the guide pins 534 allow translation only axially Only one guide pin 534 is shown; however, a plurality of guide pins 534 are spaced radially around the baseplate 536. The expansion plate is not in contact with the pressure plate 528 and clutch plate 524.

Prior to takeoff, when it is desired to prerotate the rotor assembly 22, hydraulic oil is forced into the oil way 540 from the rotary hydraulic joint 545 pressurizing the diametral passage 538, oil ports 550 and seal groove 546, all of which are continuous with oilway 540 due to "O"-rings 541 sealing clutch spindle 526 to baseplate 536. Thus, the expansion "O"-ring 548 is urged away from the face of the baseplate 536 forcing the expansion plate 532 to separate from the baseplate 536 along the guide pins 534. As the expansion plate 532 moves away from the baseplate 536, it carries its clutch shoe 530 into contact with the pressure plate 528 making a friction contact which rapidly accelerates the baseplate 536 to the speed of the idler pulley 522 which is being driven by the belts 101 from the engine pulley 520. (See FIGS. 14 and 16)

In FIG. 16, the clutch spindle 526, in order to be free to rotate, is supported in a prerotator bearing block 552 adjustably attached to the engine 32 and supporting main clutch bearing 554 which receive the clutch spindle 526 allowing the clutch spindle 526 to rotate freely therein. The clutch spindle 526 is retained on the end of the main clutch bearing 554 by means of a clutch spindle nut 556 threadedly attached and properly spaced away from the main clutch bearing by means of a spacer 558. Alternately, the clutch spindle 526 could be secured by means of keyways, locks, sleeves, splines, or other securing mechanisms known in the art. In the preferred embodiment, set screws 527 secure the baseplate 536 to the clutch spindle 526, effectively maintaining spacing and attachment. (See FIG. 16)

In FIG. 14, the clutch assembly 102 has a driven pulley 103 which drives a speed transfer 107 by means of belts 105. A first prerotator universal 560 is fixedly attached at one end to the speed transfer 107 by means of a spline or other torque transmitting mechanism known in the art. The first prerotator universal 560 is attached at the other end to a first prerotator link 564 comprising a splined slip joint to allow for self adjustment of its length. The first prerotator link 564 is fixedly attached at its upper forward end to a second prerotator universal 568. The second prerotator universal 568 is secured to a second prerotator link 569 rotatably mounted in a prerotator carrier bearing 109 supporting axial and radial loads relative to the center of rotation of the second prerotator link 569.

In FIG. 14, the uppermost end of the second prerotator link 569 likewise terminates in a third prerotator universal 571 connected at its upper end to a third prerotator link 572 comprising a lower slip member 574 and an upper slip member 576. The upper slip member 576 is attached by means of a spline or similar mechanism known in the art which allows no relative rotation but only linear translation for extension. The upper slip member 576 terminates at its upper end in a fourth prerotator universal 578 fixedly attached thereto and having at its upper extremity a bendix bearing 221 through which it is secured to the lower end of the bendix input shaft 224 to turn therewith.

In operation, the pilot activates or actuates an hydraulic flow from the prerotator actuation cylinder 346 (See FIG. 11) to deliver oil pressure through the rotary hydraulic joint 545 to the clutch spindle 526 of FIG. 16 which, in turn, delivers pressurized oil to the baseplate 536. As the baseplate 536 transmits the oil to the seal groove 546 urging the expansion "O"-ring 548 outward from the seal groove 546, the expansion plate 532 engages the pressure plate 528 by means of a clutch shoe 530 causing the entire assembly, specifically the clutch spindle 526, to spin at the rotational speed of the idler pulley 522 which is driven by engine power from the engine pulley 520.

The clutch spindle 526, through belts 105 (FIG. 14) rotates the speed transfer 107 which in turn drives the first prerotator universal 560 putting in motion the entire prerotator linkage assembly 104. The prerotator linkage assembly 104 then turns the head drive 106 comprising the bendix input shaft 224, bendix 223, and spur gear 228. The bendix extends the spur gear 228 upwardly to engage the rotor ring gear 270 (See FIGS. 17–19) thereby rotating the rotor 26 and its accompanying rotary wing assembly 28. (See FIG. 22)

As the blades 30A and 30B come up to flight speed, the pilot disengages the clutch assembly 102 so that the rotor 26 is freely rotating. Then the pilot by drawing on the collective lever 92 (FIGS. 2 and 12) adjusts the angle of attack 318 of the blades 30A and 30B, the blades 30A and 30B develop lift and the autogyro 10 is airborne.

Any time the rotary wing assembly 28 outruns the spur gear 228, the bendix 223 will disengage the spur gear 228. Meanwhile, the rotary wing assembly 28 will continue to rotate in flight by virtue of the air moving rearwardly through the tilted rotary wing assembly 28 in response to the forward motion of the autogyro 10, which motion is in response to the push of the propeller 34.

Figure 25:
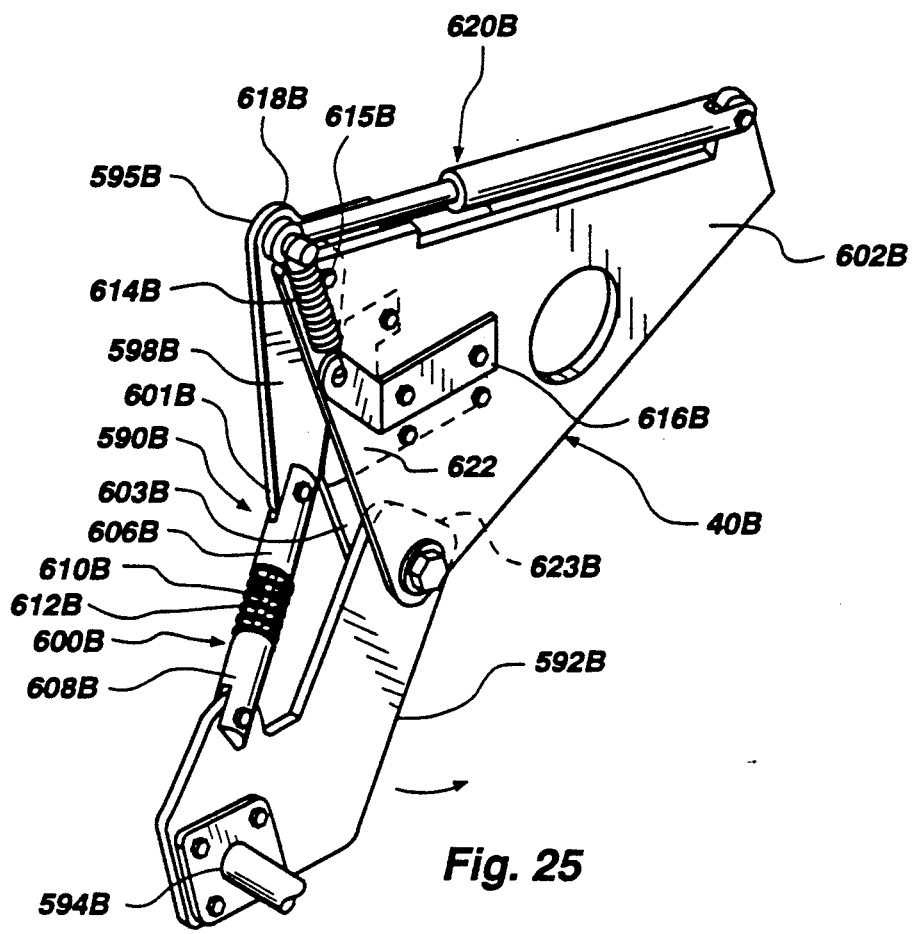
FIG. 25 is a perspective view of the right main landing gear of the invention in an extended configuration.
Figure 26:
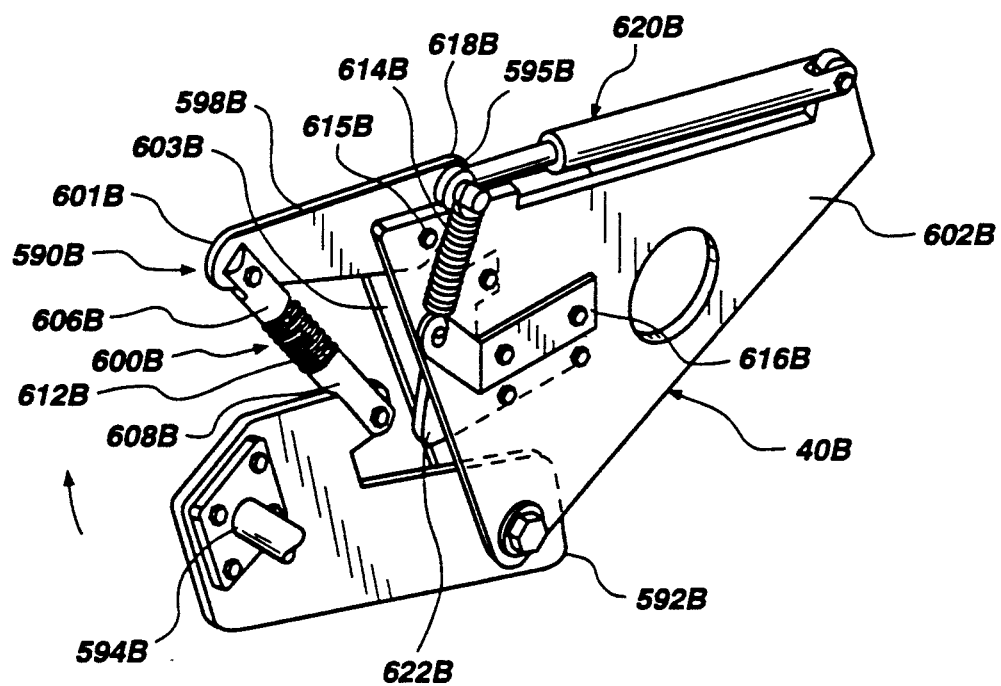
FIG. 26 is a partial perspective view of the right main landing gear of the invention in a retracted configuration.

In FIGS. 1 and 2, the main landing gear 40A, 40B on the left and right sides of the extensions 36A, B, are identical mirror images of one another. FIGS. 25 and 26 show the right main landing gear 40B in an extended (FIG. 25) and a retracted (FIG. 26) configuration. Main gear strut 590B comprises a first support member 598B attached to a second support member 600B below it. The upper end 595B of the first support member 598B pivots between the gear outboard support plate 602B and the similar but truncated gear inboard support plate 603B. The support plates 602B and 603B are mounted to the leading edge spar 119B and trailing edge spar 117B of extension 36B by bolts, rivets, welding or other suitable means. The lower end 601B of the first support member 598B attaches pivotally against the top of the second support member 600B, which absorbs the shock of landing forces or roughness in the runway. The second support member 600B comprises a top shock element 606B and a bottom shock element 608B connected by a long shock bolt 610B inside of and retaining a coil spring 612B, compressed when the top shock element 606B closes toward the bottom shock element 608B.

In FIG. 26, the main gear 40B is shown retracted. The breakover spring 614B, breaking over pivot 615B and attached to the spring anchor arm 616B, is shown attached to the main strut anchor 618B by which it maintains the main gear 40B in either an extended or retracted position after actuation. The main gear hydraulic cylinder 620B provides the force of actuation. The gear stop block 622B provides a strong, stable support for the main gear strut 590B in the extended position, by maintaining the first support member 598B. That is, the gear stop block 622B is oriented to support the wheel 41B (FIGS. 1–2) when the autogyro lo is on the ground. Retracted, the main landing gear 40B is held up by the breakover spring 614B which helps lift it and retains it in a stable position by breaking over pivot 615B.

Figure 27:
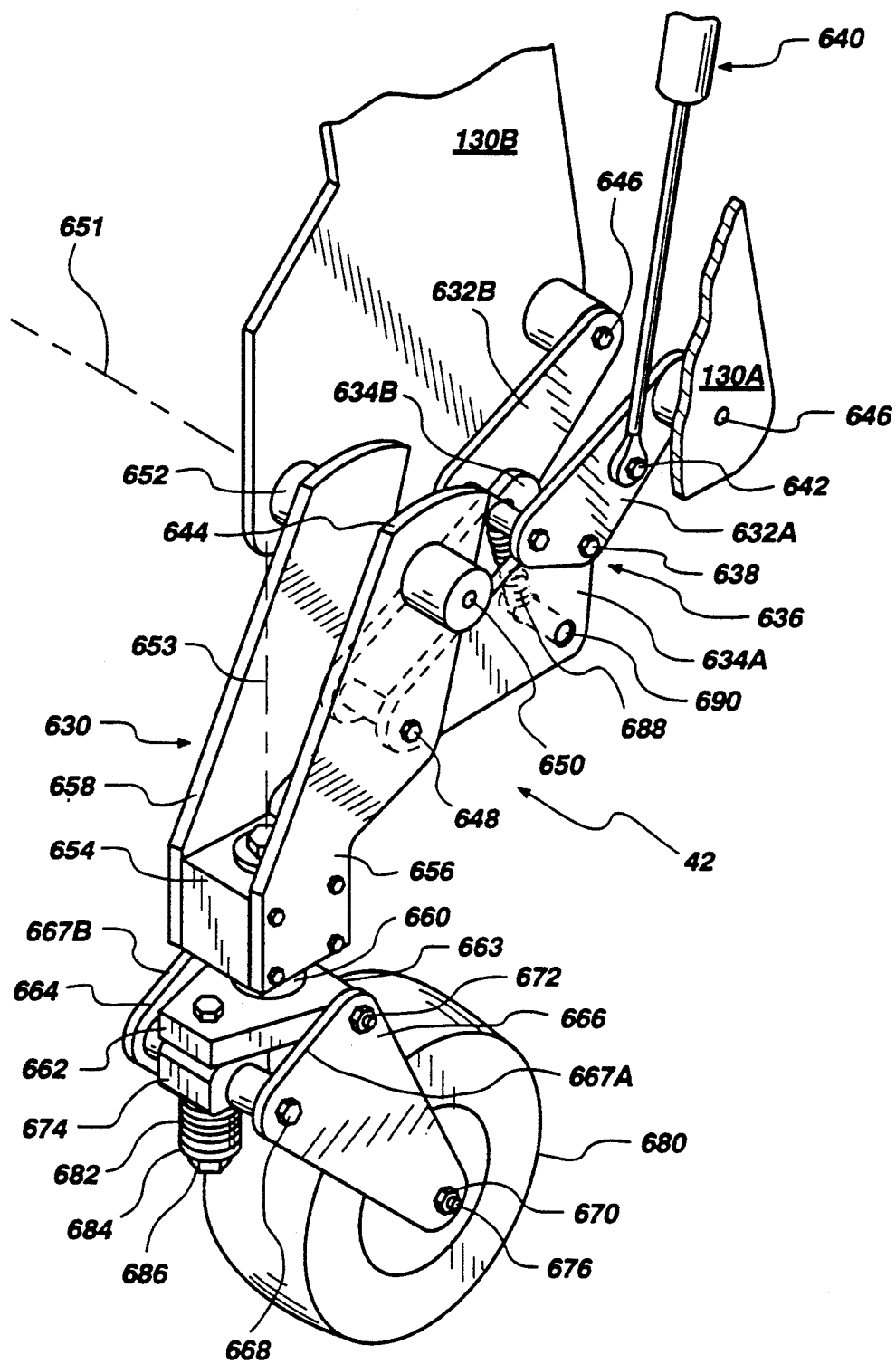
FIG. 27 is a partial perspective view of the nose landing gear of the invention in an extended configuration.

In FIG. 27, attached between the right tunnel plate 130B and the left tunnel plate 130A of the frame is the nose gear 42 having as its principal member a nose strut 630. The nose gear 42 has upper nose elements 632A, 632B and lower nose elements 634A, 634B forming broken nose strut 636 by being attached together at the nose break axle 638. The upper nose elements 632A and 632B are bolted to the left and right tunnel plates 130A and 130B, respectively. When the upper nose elements 632A and 632B of the broken nose strut 636 are rotated by a nose hydraulic cylinder 640 lifting from the nose lift point 642, the nose stop axle 644 lifts away from the lower nose elements 634A, 634B where the nose stop axle 644 is supported when the nose gear 42 is in the extended position.

The upper end of the nose hydraulic cylinder 640 is attached to the left tunnel plate 130A. The upper nose elements 632A, 632B are rotated about the nose strut upper pivot point 646 folding the nose break axle 638 near the center of the broken nose strut 636 forward and upward. As the lower nose elements 634A, 634B move upward they rotate forward about the nose strut bottom axle 648 which must move upward and rearward lifting the nose strut 630 and rotating it rearward about the left nose pivot 650 and the right nose pivot 652 which share the same axis of rotation 651.

The nose strut 630 when "down" or in its extended position, extends forward to a nose bearing block 654 at its front lower extremity. The nose bearing block 654 serves as a spacer and structure between the left nose strut plate 656 and right nose strut plate 658. The nose bearing block 654 receives and retains the nose spindle 660 which is attached at its own lower end to a nose trailing arm block 662 to rotate about a vertical axis of rotation 653.

The nose trailing arm block 662 is penetrated through and between its rear vertices 663 for attachment of a right nose trail plate 664 and a left nose trail plate 666, identical modified triangles with each of their corresponding vertices connected between them by bolts or other suitable means of attachment.

The upper edge 667B of the right nose trail plate 664, and the upper edge 667A of the left nose trail plate 666 angle forwardly and slightly downwardly to the front trail axle 668 then downwardly and rearwardly to the lower trail axle 670. The left nose trail plate 666 then angles forwardly and upwardly to the upper trail axle 672. A bolt to form each axle (668, 670, 672) runs through holes drilled between the right nose trail plate 664 and the left nose trail plate 666, capturing on front trail axle 668 a spring push block 674 having a center penetration vertically through it. Through the lower trail axle 670 runs the nose wheel axle 676 about which turns the front nose wheel 680.

The spring push block 674 contacts a coil spring 682 retained below it by a bolt running downwardly through a hole at the front edge of the nose trailing arm block 662, exiting that and proceeding into and through the spring push block 674, thereafter proceeding downwardly through the coil spring 682 and spring retaining plate 684 where it terminates in a spring retaining nut 686.

The nose gear 42 is configured so that the nose wheel axle 676 trails substantially behind the upper trail axle 672, which is slightly behind the axis of rotation 653 of the nose spindle 660. Thus, the nose wheel axle 676 will support the nose wheel 680 which will caster about the nose spindle 660, not requiring any steering linkage.

Figure 28:
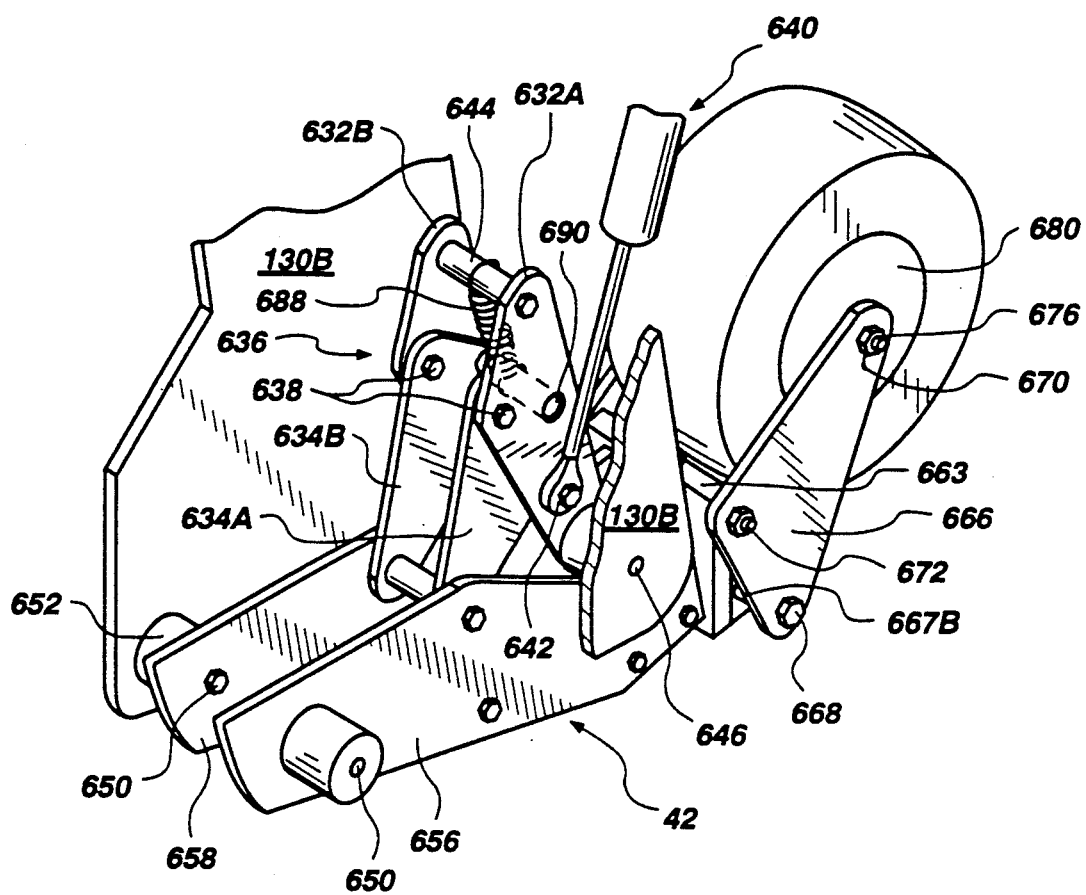
FIG. 28 is a partial perspective view of the nose landing gear of the invention, in a retracted configuration.

FIG. 28 shows the nose gear 42 in the retracted position. The nose breakover spring 688 maintains the nose breakover axle 690 in a stable position whether the nose gear 42 is retracted or extended. The full structural strength of the broken nose strut 636 operating to support the nose gear 42 is thus maintained.

Figure 29:
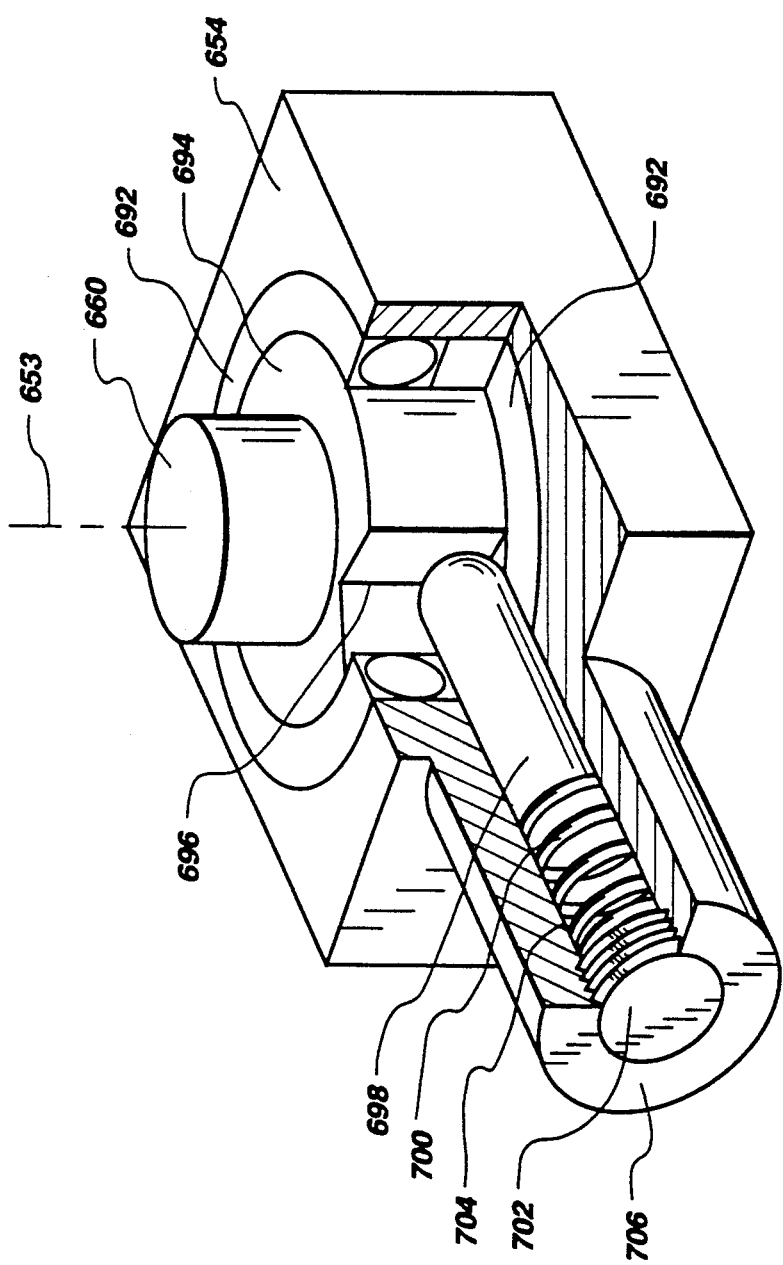
FIG. 29 is a cut-away perspective view of the nose bearing block and nose spindle of FIG. 27 showing the cam which centers the nose wheel.

In FIG. 29, the nose bearing block 654 (located as shown in FIG. 27) is provided with bearings 692 to allow free rotation of nose spindle 660. However, cam 694 is secured to nose spindle 660 so that both move together inside bearings 692 which are shown as ball bearings, but could be roller bearings to better support combinations of axial and radial loads on the nose spindle 660, or could be any combination of thrust bearings and radially loaded bearings. Cam 694 has an indentation 696 into which the round end of detent 698 is forced by a detent spring 700. A cap 702 retains the detent spring 700 inside the detent way 704 formed in detent mount 706 which is either integrally formed with or attached by bolts or other means to the nose bearing block 654. The stiffness of detent spring 700 is sufficient to return cam 694 to its centered position as shown in FIG. 29 so that the nose wheel 680 (FIGS. 27-28) pivoting with nose spindle 660 does not actually caster freely. Rather, a force applied to rotate the nose wheel 680 about the vertical axis of rotation 653 will cause castering, but when the force abates, detent 698 centers the cam 694, the nose spindle 660 and with them the nose wheel 680.

In the components discussed in this disclosure, appropriate high-strength, lightweight alloys are desirable to provide a durable aircraft. In the preferred embodiment, structural members have sufficient thickness to prevent plate and column buckling as well as yielding under axial and shear stress. In addition, to reduce wear, moving parts such as axles and bolts on which other parts turn are protected with bushings or bearings. Likewise, where long structures such as plates and bars have lateral loads, their section modulus is sufficient to provide a safety factor above design strength. In cases where the penetrations in plates will receive loadings transverse to the centerline of the penetration, thickness and diametral tolerance are designed to not fail by yielding or wear.

It will be understood that the foregoing description is but of one embodiment. Those skilled in the art will recognize that other arrangements may be used without deviating from the teachings or the invention which is set forth in more detail in the following claims

I claim:

1. An autogyro comprising:
   frame means to support a load in flight and on a support surface;
   support means connected to extend beneath said frame means to support said autogyro upon a surface;
   tower means attached to said frame means to extend above said frame means, said tower means having a distal end and a tower longitudinal axis;
   head means tiltably attached to said distal end of said tower means to tilt relative to said tower longitudinal axis, said head means having a rotor axis, a head pitch axis and a head roll axis;
   rotor means rotatably attached to said head means to rotate about said rotor axis, said rotor means having a teeter axis;
   wing means attached to said rotor means to extend away therefrom and rotate therewith to generate a lift force, said wing means being comprised of blade means tiltable between a first minimum lift angle and a second maximum lift angle;
   propulsion means attached to said frame means for generating a force to urge said autogyro forward, and to selectively rotate said rotor means;
   first control means connected to said frame means to control operation of said propulsion means, said first control means having means positioned to be operable by a user supported on the frame means;
   second control means connected to said head means to control the tilting of said head means, said second control means having means positioned to be operable by the user; and
   third control means connected to said rotor means to tilt said wing between said first minimum lift angle and said second maximum lift angle and to selectively adjust said wing at any position thereof between said first minimum lift angle and said second maximum lift angle, said third control means having means for actuation positioned to be operable by the user.

2. An autogyro as in claim 1, wherein said frame means includes:
   right boom means attached to said right side of said frame means to extend rearwardly therefrom and having an aft end;
   left boom means attached to said left side of said structure means to extend rearwardly therefrom, and having an aft end;
   strut means attached between said aft end of said right boom and said aft end of said left boom to connect and support said right boom and said left boom; and
   skin means attached to said frame means to provide an aerodynamic shell called a fuselage.

3. An autogyro as in claim 1 further including:
   tower control linkage means movably attached to the tower means to transfer each respective motion of the second and third control means to said head means and said wing means, respectively; and
   tower drive linkage means movably attached to said tower structure means to selectively connect said head means and said propulsion means to transfer power from said propulsion means to said head means.

4. An autogyro as in claim 1 further comprising:
   platform means supporting the rotor means, said platform means having a head pitch axis, a head roll axis, and a rotor axis;
   head attachment means to tiltably connect the head means to the tower means;
   spindle means to rotatably attach said head means to said rotor means;
   head drive means rotatably connected to said platform means to engage said rotor means and to rotate said rotor means prior to takeoff;
   control linkage means flexibly connected to said head means to independently transfer each appropriate motion of the second control means to said head means;

head drive linkage means rotatably connected to said head drive means to transfer power from said propulsion means to said head drive means.

5. An autogyro as in claim 1 further including:
rotor yoke means of the rotor means supporting the wing means and the spindle means, said rotor yoke means having a teeter axis and a blade pitch axis;
rotor drive means fixedly attached to said rotor means to selectively transmit power from said head drive means to said rotor means;
swash plate means movably attached to said rotor yoke means to transmit motions from the third control means to said wing means; and
rotor brake means attached to the head means to stop rotation of said rotor means.

6. An autogyro as in claim 1 further comprising:
teeter box means tiltably attached to the rotor means and supporting the wing means;
bearing means rotatably attached to said teeter box means to turn about a longitudinal axis of said wing means;
at least two spar means in said wing means, said spar means each having a proximal end and a distal end, said proximal end attached to said bearing means and said distal end extending away therefrom;
connection means securing said spar means to said bearing means and distributing forces along said spar means and said teeter box means;
blade means attached to said spar means to provide aerodynamic lift, said blade means having a chord, a leading edge, a trailing edge, a blade longitudinal axis, means for changing blade pitch by rotation of said chord about said blade longitudinal axis, and said blade means also having a flap direction perpendicular to a plane defined by said chord and said blade longitudinal axis, and a lead-lag direction perpendicular to said blade longitudinal axis and tangent to the rotation of said rotor means;
pitch change horn means attached to each of said spars; and
pitch control linkage means flexibly attached to a swash 112 plate and each of said pitch change horns means to transmit motions of said third control means to said pitch change horns to rotate said blade means about said blade longitudinal axis.

7. An autogyro as in claim 1 wherein:
the propulsion means includes engine means attached to the frame means to provide motive power for the autogyro, said engine means having a rotating shaft means;
airscrew means attached to said rotating shaft means and directing air to move the autogyro forward;
drive means interconnecting said rotating shaft means and said engine means.

8. An autogyro as in claim 1, further including prerotator means drivingly connected to the propulsion means for selectively rotating said rotor means up to the takeoff velocity of said rotor means and disconnecting said rotor means from said propulsion means prior to takeoff.

9. An autogyro as in claim 8, wherein the prerotator means comprises:
first drive means connected to the propulsion means to transmit power therefrom;
idler means drivingly connected to said propulsion means through said first drive means and rotatably connected to said frame means to transmit power from said propulsion means;
clutch means attached to said frame means and mounted to disengage said idler means from said first drive means;
linkage means connected to said clutch means and to said rotor means;
second drive means slidably connected to said linkage means and rotatably connected to said head means to engage said rotor means;
mounting means attached to said frame means and said tower means, and rotatably attached to said linkage means to support and stabilize said linkage means.

10. An autogyro as in claim 7, further including control surface means attached to the frame means to receive airflow from the airscrew means to cause said autogyro to rotate about said yaw axis and said pitch axis.

11. An autogyro as in claim 10, wherein said control surface means includes:
a right stabilizer means having a leading edge, trailing edge, base end and a tip end, said base end attached to said aft end of the right boom means, and extending upwardly and centerward to stabilize said autogyro;
a left stabilizer means having a leading edge, trailing edge, base end and a tip end, said base end attached to said aft end of said left boom means, and extending upwardly and centerward, and connected to said tip of said right stabilizer to stabilize said autogyro;
right ruddervator means hingedly attached to said trailing edge of said right stabilizer to direct airflow past said right stabilizer to urge said autogyro to turn about said yaw axis, and said pitch axis; and
left ruddervator means hingedly attached to said trailing edge of said left stabilizer to direct airflow past said left stabilizer to urge said autogyro to turn about said yaw axis, and said pitch axis.

12. An autogyro as in claim 11, further including pedal control means movably attached to the frame means to actuate the right ruddervator means and the left ruddervator means.

13. An autogyro as in claim 12, further including:
right foot pedal means and left foot pedal means movably attached to the frame;
first pedal linkage means movably attached to one of said foot pedal means and to said right and left ruddervator means to transmit pedal motion to said right and left ruddervator means; and
second pedal linkage means movably attached to said other foot pedal means and said left and right ruddervator means to actuate said right and left ruddervator means.

14. An autogyro as in claim 13 further including stick control means movably attached to said frame means to actuate tilting motions of said head means.

15. An autogyro as in claim 14, wherein said stick control means includes:
handle means, having a proximal end, a pivot point, and a distal end;
tube means rotatably secured to the frame means, having a proximal end and a distal end, hingedly connected at said proximal end to said distal end of said handle means to actuate tilting motion of said head means about said roll axis;
roll linkage means flexibly connected to said distal end of said tube means to transmit rotating motion of said tube means to tilting motion of said head means about said roll axis;

rod means slidably secured within said tube means, said rod means having a proximal end and a distal end, said rod means hingedly connected by its said proximal end to said pivot point of said handle means to actuate tilting motion of said head means about said pitch axis;

pitch linkage means flexibly connected to said distal end of said rod means to transmit motion of said rod means to tilting motion of said head means about said pitch axis.

16. An autogyro as in claim 6 further including collective pitch control means movably attached to said frame means for selective adjustment of the position of the chord of the wing means about the blade longitudinal axis to any position intermediate said first minimum lift angle and said second maximum lift angle.

17. An autogyro as in claim 16, wherein the collective pitch control means comprises:

lever means to actuate change of blade pitch motion of the wing means, said lever means having a proximal end, a connection point, and a distal end;

grip means attached to said proximal end of said lever means to receive an operators hand to move said lever means;

pivot means to hingedly attach said lever means to said frame means;

linkage means flexibly attached to said lever means near said distal end of said lever means, to transmit motion of said lever means to said rotor means.

18. An autogyro as in claim 2, further including:

tower control linkage means movably attached to the tower means to transfer each respective motion of the second and third control means to said head means and said wing means, respectively; and tower drive linkage means movably attached to said tower structure means to transfer power from said propulsion means to said head means.

19. An autogyro as in claim 3, further comprising:

platform means supporting the rotor means, said platform means having a head pitch axis, a head roll axis, and a rotor axis;

head attachment means to tiltably connect the head means to the tower means;

spindle means to rotatably attach said head means to said rotor means;

head drive means rotatably connected to said platform means to engage said rotor means and to rotate said rotor means prior to takeoff;

control linkage means flexibly connected to said head means to independently transfer each appropriate motion of the second control means to said head means;

head drive linkage means rotatably connected to said head drive means to transfer power from said propulsion means to said head drive means.

20. An autogyro as in claim 4, further including:

rotor yoke means of the rotor means supporting the wing means and the spindle means, said rotor yoke means having a teeter axis and a blade pitch axis;

rotor drive means fixedly attached to said rotor means to transmit power from said head drive means to said rotor means;

swash plate means movably attached to said rotor yoke means to transmit motions from the third control means to said wing means; and rotor brake means attached to the head means to prevent rotation of said rotor means.

21. An autogyro as in claim 20, further comprising:

teeter box means tiltably attached to the rotor means and supporting the wing means;

bearing means rotatably attached to said teeter box means to turn about a longitudinal axis of said wing means;

at least two spar means in said wing means, said spar means each having a proximal end and a distal end, said proximal end attached to said bearing means and said distal end extending away therefrom;

connection means securing said spar means to said bearing means and distributing forces along said spar means and said teeter box means;

blade means attached to said spar means to provide aerodynamic lift, said blade means having a chord, a leading edge, a trailing edge, a blade longitudinal axis, means for changing blade pitch by rotation of said chord about said blade longitudinal axis, and said blade means also having a flap direction perpendicular to a plane defined by said chord and said blade longitudinal axis, and a lead-lag direction perpendicular to said blade longitudinal axis and tangent to the rotation of said rotor means;

pitch change horn means attached to each of said spars; and pitch control linkage means flexibly attached to said swash plate and each of said pitch change horns means to transmit motions of said control means to said pitch change horns to rotate said blade means about said blade longitudinal axis.

22. An autogyro as in claim 21, wherein:

the propulsion means includes engine means attached to the frame means to provide motive power for the autogyro, said engine means having a rotating shaft means;

airscrew means attached to said rotating shaft means and directing air to move the autogyro forward;

drive means interconnecting said rotating shaft means and said engine means.

23. An autogyro as in claim 22, further including pre-rotator means drivingly connected to the propulsion means to selectively transmit power to the rotor means.

24. An autogyro as in claim 23, wherein the prerotator means comprises:

first drive means connected to the propulsion means to transmit power therefrom;

idler means drivingly connected to said propulsion means through said first drive means and rotatably connected to said frame means to transmit power from said propulsion means;

clutch means attached to said frame means and mounted to disengage said idler means from said first drive means;

linkage means connected to said clutch means and to said rotor means;

second drive means slidably connected to said linkage means and rotatably connected to said head means to engage said rotor means;

mounting means attached to said frame means and said tower means, and rotatably attached to said linkage means to support and stabilize said linkage means.

25. An autogyro as in claim 24, wherein said control surface means includes:

a right stabilizer means having a leading edge, trailing edge, base end and a tip end, said base end attached to said aft end of the right boom means, and extending upwardly and centerward to stabilize said autogyro;

a left stabilizer means having a leading edge, trailing edge, base end and a tip end, said base end attached to said aft end of said left boom means, and extending upwardly and centerward, and connected to said tip of said right stabilizer to stabilize said autogyro;

right ruddervator means hingedly attached to said trailing edge of said right stabilizer to direct airflow past said right stabilizer to urge said autogyro to turn about said yaw axis, and said pitch axis; and left ruddervator means hingedly attached to said trailing edge of said left stabilizer to direct airflow past said left stabilizer to urge said autogyro to turn about said yaw axis, and said pitch axis.

26. An autogyro as in claim 25, further including pedal control means movably attached to the frame means to actuate the right ruddervator means and the left ruddervator means.

27. An autogyro as in claim 26, further including:
right foot pedal means and left foot pedal means movably attached to the frame;
first pedal linkage means movably attached to one of said foot pedal means and to said right and left ruddervator means to transmit pedal motion to said right and left ruddervator means; and
second pedal linkage means movably attached to said other foot pedal means and said left and right ruddervator means to actuate said right and left ruddervator means.

28. An autogyro as in claim 27, further including stick control means movably attached to said frame means to actuate tilting motions of said head means.

29. An autogyro as in claim 28, wherein said stick control means includes:
handle means, having a proximal end, a pivot point, and a distal end;
tube means rotatably secured to the frame means, having a proximal end and a distal end, hingedly connected at said proximal end to said distal end of said handle means to actuate tilting motion of said head means in said roll axis plane;
roll linkage means flexibly connected to said distal end of said tube means to transmit rotating motion of said tube means to tilting motion of said head means in said roll axis plane;
rod means slidably secured within said tube means, said rod means having a proximal end and a distal end, said rod means hingedly connected by its said proximal end to said pivot point of said handle means to actuate tilting motion of said head means in said pitch axis plane;
pitch linkage means flexibly connected to said distal end of said rod means to transmit motion of said rod means to tilting motion of said head means in said pitch axis plane.

30. An autogyro as in claim 29, further including collective pitch control means movably attached to said frame means to actuate rotation of the chord of the blade means about the blade longitudinal axis.

31. An autogyro as in claim 30, wherein the collective pitch control means comprises:
lever means to actuate change of blade pitch of the wing means, said lever means having a proximal end, a connection point, and a distal end;
grip means attached to said proximal end of said lever means to receive an operators hand to move said lever means;
pivot means to hingedly attach said lever means to said frame means;
linkage means flexibly attached to said lever means near said distal end of said lever means, to transmit motion of said lever means to said rotor means.

* * * * *